(12) United States Patent
Zimmerman, II et al.

(10) Patent No.: US 10,646,766 B2
(45) Date of Patent: May 12, 2020

(54) GOLF SWING TRAINING DEVICE

(71) Applicant: Fitness South, LLC, Trussville, AL (US)

(72) Inventors: Richard Daniel Zimmerman, II, Trussville, AL (US); Harold Bowman Blach, Jr., Birmingham, AL (US); David Lee Stone, Lowell, AR (US); Joseph Eual Austin, Rogers, AR (US); Philip Mark Walker, Cave Springs, AR (US)

(73) Assignee: Fitness South, LLC, Trussville, AL (US)

( * ) Notice: Subject to any disclaimer, the term of this patent is extended or adjusted under 35 U.S.C. 154(b) by 68 days.

(21) Appl. No.: 15/725,249

(22) Filed: Oct. 4, 2017

(65) Prior Publication Data

US 2018/0093155 A1    Apr. 5, 2018

Related U.S. Application Data

(60) Provisional application No. 62/404,082, filed on Oct. 4, 2016.

(51) Int. Cl.
| | |
|---|---|
| *A63B 69/36* | (2006.01) |
| *A63B 24/00* | (2006.01) |
| *A63B 21/005* | (2006.01) |
| *A63B 21/22* | (2006.01) |
| *A63B 71/06* | (2006.01) |
| *G09B 19/00* | (2006.01) |

(52) U.S. Cl.
CPC ...... *A63B 69/3644* (2013.01); *A63B 21/0058* (2013.01); *A63B 21/22* (2013.01); *A63B 24/0062* (2013.01); *A63B 24/0075* (2013.01); *A63B 24/0087* (2013.01); *A63B 71/0622* (2013.01); *A63B 2209/08* (2013.01); *A63B 2210/50* (2013.01); *A63B 2220/10* (2013.01); *A63B 2220/12* (2013.01); *A63B 2220/13* (2013.01); *A63B 2220/30* (2013.01); *A63B 2220/805* (2013.01); *A63B 2220/833* (2013.01); *A63B 2220/89* (2013.01); *A63B 2225/09* (2013.01); *A63B 2225/093* (2013.01); *A63B 2225/50* (2013.01); *G09B 19/0038* (2013.01)

(58) Field of Classification Search
CPC . A63B 69/3644; A63B 69/3641; A63B 21/22; A63B 24/0087; A63B 2220/36
USPC .......................................... 473/223, 258–260
See application file for complete search history.

(56) References Cited

U.S. PATENT DOCUMENTS

| | | | |
|---|---|---|---|
| 1,567,530 A | * | 12/1925 | MacNaughton ... A63B 69/3641 473/229 |
| 1,634,102 A | | 6/1927 | Hansen |
| 1,960,787 A | | 5/1934 | MacStocker |
| 3,794,329 A | | 2/1974 | Wilson |

(Continued)

*Primary Examiner* — John E Simms, Jr.
*Assistant Examiner* — Rayshun K Peng
(74) *Attorney, Agent, or Firm* — Boyd D. Cox

(57) ABSTRACT

A golf swing training device for improving the accuracy, club head speed and power of a user's swing can be customized to fit the various abilities and sizes of individual golfers. The device guides a user through the proper swing and by repeating the proper swing, the user can enhance his or her muscle memory. The golf swing training device includes a shuttle moveably mounted on an adjustably supported ring and a club moveably supported by the shuttle.

51 Claims, 29 Drawing Sheets

(56) References Cited

U.S. PATENT DOCUMENTS

| | | | |
|---|---|---|---|
| 3,795,399 A * | 3/1974 | Beckish | A63B 69/3644 |
| | | | 473/229 |
| 5,072,942 A * | 12/1991 | Hurley | A63B 69/3644 |
| | | | 473/229 |
| 5,131,660 A * | 7/1992 | Marocco | A63B 69/3685 |
| | | | 473/220 |
| 5,439,225 A | 8/1995 | Gvoich et al. | |
| 5,595,545 A * | 1/1997 | O'Brien | A63B 69/3644 |
| | | | 473/259 |
| 5,895,327 A | 4/1999 | Francisco | |
| 5,984,798 A * | 11/1999 | Gilmour | A63B 69/3644 |
| | | | 473/221 |
| 6,579,214 B2 | 6/2003 | Crump | |
| 6,935,968 B1 | 8/2005 | Thomas | |
| 7,056,224 B1 | 6/2006 | Keyes | |
| 7,144,340 B1 | 12/2006 | Jones et al. | |
| 17,153,245 | 12/2006 | Kim | |
| 7,238,116 B1 | 7/2007 | Sulzener | |
| 7,806,780 B1 * | 10/2010 | Plunkett | A63B 69/3641 |
| | | | 473/229 |
| 7,862,444 B2 | 1/2011 | Jones | |
| D636,042 S | 4/2011 | Campitelli | |
| 7,946,927 B2 | 5/2011 | Bowers | |
| 7,988,563 B2 | 8/2011 | Turner | |
| 8,007,421 B2 | 8/2011 | Goel et al. | |
| 9,283,463 B2 * | 3/2016 | Zimmerman, II | A63B 69/3644 |
| 2005/0068769 A1 * | 3/2005 | Schwarz | G01N 21/8806 |
| | | | 362/219 |
| 2008/0153618 A1 | 6/2008 | Arther | |
| 2013/0065704 A1 * | 3/2013 | Napolitano | A63B 69/3644 |
| | | | 473/259 |

* cited by examiner

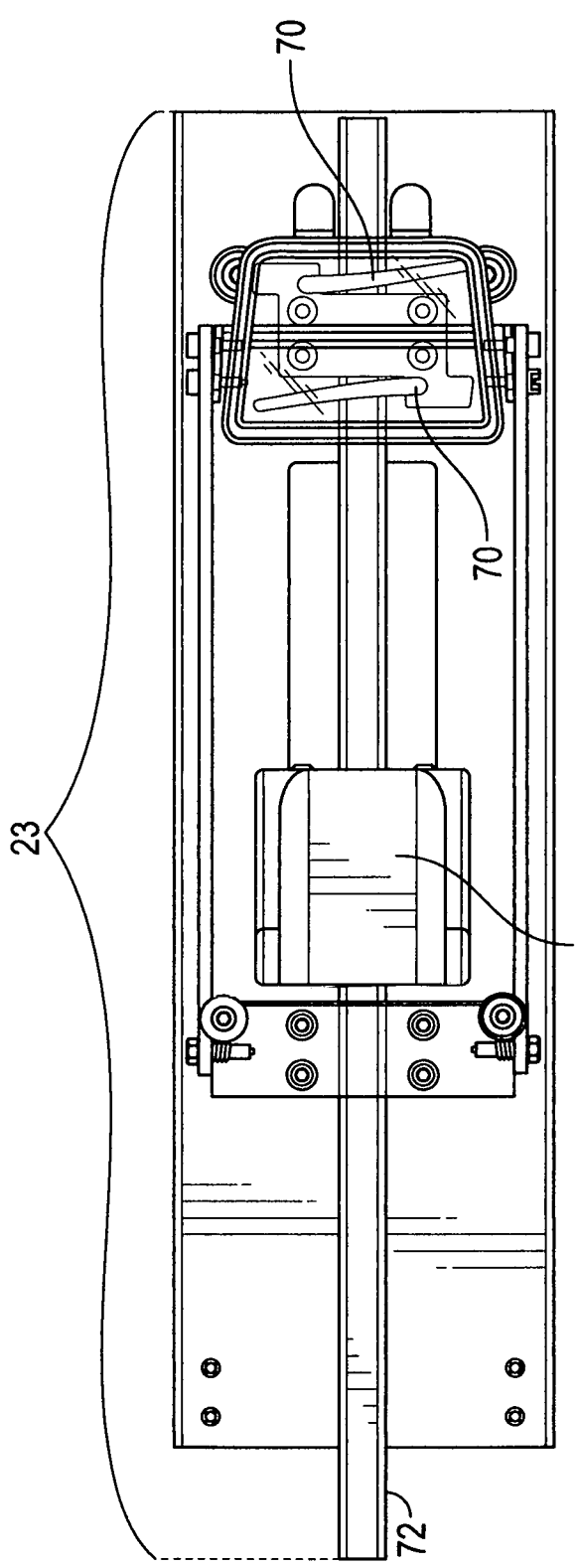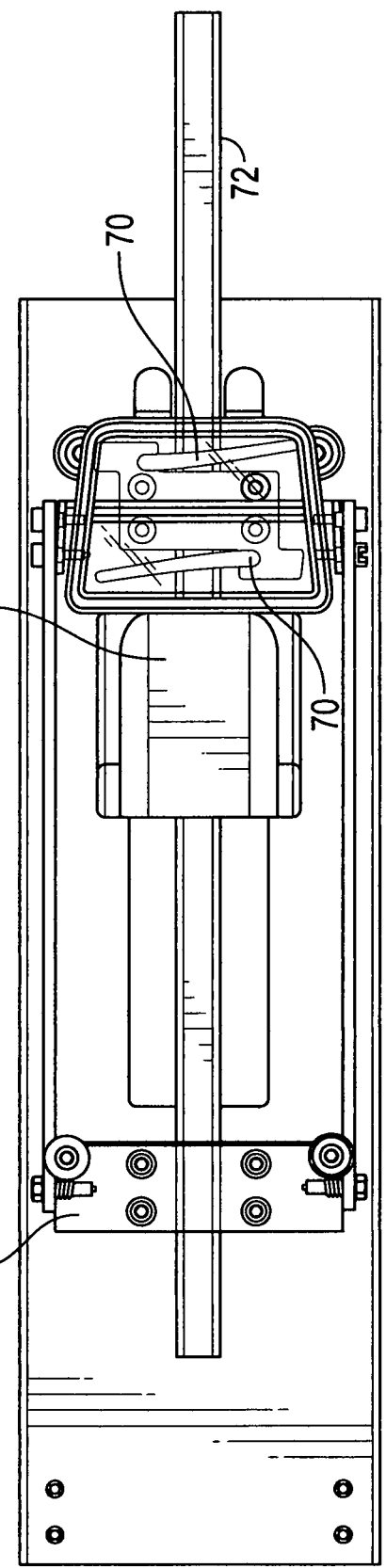
FIG. 12A
FIG. 12B

GOLF SWING TRAINING DEVICE

Priority for this application is claimed from U.S. Provisional Application No. 62/404,082 entitled "Golf Swing Training Device" filed on Oct. 4, 2016

BACKGROUND

The present invention is directed to a golf swing training device for improving the accuracy, club head speed and power of a user's swing. The training device's adjustability allows the device to be customized and fitted to the various abilities and sizes of individual users.

Golf is a challenging sport that is generally dependent on hitting and landing the golf ball at a desired location. Having a proper swing is one of the requisites for achieving a successful degree of accuracy when hitting the ball.

A golf swing is characterized by many elements, including grip, posture, tempo, and forearm position, all of which must be correctly executed to ensure a proper and successful golf swing. With the proper swing, the golfer is more likely to strike the golf ball in such a way as to land the bail nearer to a desired location.

Known training devices of the prior art typically guide a golfer through a swing by only constraining the club within a particular selected swing plane. With such devices the golfer's hands are free to advance throughout the swing without a corresponding rotation of his or her body, resulting in an improper swing. Therefore, the prior art fails to address the problem of a golfer's body not rotating throughout the swing.

The golf swing training device of the present invention not only constrains the club within the proper swing plane, but also monitors, controls and enhances the position and feel of the club throughout all the phases of the golfer's swing. Also, the device can increase a golfer's hitting accuracy by correctly positioning the user's arms relative to the body and forcing the user to complete the correct, take away, back swing and downswing. Repeated use of the golf swing training device increases an individual's muscle memory for the proper swing.

Additionally, club head speed can be improved as a result of using the device. During use, the device properly positions the user's hands in relation to the desired twist in his or her torso and maintains proper positioning of the hands relative to the body throughout the entire swing.

Resistance can be delivered to the club's shaft via an adjustable resistance mechanism in a shuttle component to thereby increase the strength of the golfer. Furthermore, particular muscle groups used during a swing can be especially targeted and developed using the device.

Devices of the prior art are limited by functioning only to constrain the club to a particular swing plane in order to guide the golfer through his or her swing. Such known devices fail to provide continuous monitoring and control of the club's movement throughout, the golfer's backswing, downswing and follow-through.

The golf swing training device of the present invention monitors, controls and enhances the position and feel of the club through all of the phases of a golfer's swing.

Furthermore, the present invention enables a user to improve his or her accuracy, club head speed and power. A locked condition of the club shaft on the shuttle during selected stages of the swing, coupled with a "shove" of the shaft that takes place during the backswing, constrains the golfer's body to rotate in an advanced phase relative to the position of the hands. In other words, this combination of conditions forces the body to move in a rotational manner ahead of the movement of the hands during the swing and acts to maintain the club in the optimal swing plane throughout the swing, thereby improving the user's swing accuracy and club head speed.

With the present invention, the user can move through his or her swing with the golf swing training device assisting to guide the club through the correct swing. By repeating the correct movement promoted by the device, the golfer can develop his or her muscle memory for the proper swing. This repeated movement reinforces the proper muscle memory so that the user is eventually able to make the correct swing movement without the assistance of the device.

The golf swing training device coordinates the motion of a golfer's arms relative to his or her body during the downswing. The golf swing training device enables a mechanically-constrained swing to be coordinated with a biomechanically-constrained body in order to create a proper swing that is based on the ideal swing kinematics of successful golfers. Such a device is not contemplated in the prior art. The device of the present invention aids the golfer in swinging the club correctly while enhancing accuracy, power and swing speed.

SUMMARY

The present invention is a golf swing training device that guides a user through the proper swing and concurrently enhances his or her strength. The device can be adjusted to fit each individual golfer and, therefore, can be customized for each user.

The device includes a ring that, is mounted on a support base and a shuttle that is moveably mounted on the ring. The shuttle includes a shuttle resistance mechanism, a club shove mechanism and a club lock mechanism for controlling a club. The club is engaged with the shuttle.

The shuttle resistance mechanism provides a resistant force that opposes movement of the shuttle along the ring. The shuttle resistance mechanism can be adjusted to a selected magnitude and to a desired mode of operation.

The club lock mechanism selectively locks the club's shaft against axial movement within the shuttle throughout portions of the user's backswing and downswing.

The club shove mechanism moves the club shaft axially to create a shoving effect on the club and thereby positions the user's arms in proper position during the swing.

The "handedness" of the golfer is detected by the shuttle. Upon insertion of the club into the shuttle, the golf swing training device determines if the golfer is left-handed or right-handed by the direction of the club's insertion.

The golf swing training device constantly monitors the position of the shuttle and the club on the ring in order to apply the resistance and the shove at the correct locations of the shuttle and club along the ring.

It is an object of the present invention to provide a golf swing training device that guides a golf club through the proper positions during the user's golf swing.

It is a further object of the present invention to improve the accuracy of a user's swing by providing a device that forces the user to swing the club through the proper swing plane.

It is a further object of the present invention to provide a golf swing training device that can increase the speed of a golfer's club head during his or her swing.

It is at further object of the present invention to provide a method for improving the power of a user's swing.

It is a further object of the present invention to provide a device that enables the user to repeatedly reenact the same proper movement of his or her club for successive swings.

It is a further object of the present invention to provide a training device and method of use that enables a golfer to develop muscle memory for a proper golf swing.

It is a further object of the present invention to provide a golf swing training device that can be adjusted to fit various sized users.

It is a further object of the present invention to provide a golf swing training device that properly coordinates the position of a golfer's hands in relation to the twist in his or her torso throughout the golf swing.

It is a further object of the present invention to provide a golf swing training device that can determine the golfer's handedness.

It is a further object of the present invention to provide a golf swing training device that analyzes the direction of insertion of the golf club to determine if the golfer's swing is left- or right-handed.

It is a further object of the present invention to provide a computer-controlled, servomotor-actuated shuttle that maintains an optimal relationship between the position of the golfer's hands and the twist in his or her torso.

It is a further object of the present invention to provide a golf swing training device with a shuttle having an electromechanical head subassembly that simulates the visual appearance of the head of a golf club.

It is a further object of the present invention to provide a shuttle that allows four degrees of freedom for guiding a golf club along the proper path of the golfer's swing.

It is a further object of the present invention to provide a shuttle for a golf swing training device with a head subassembly that promotes axial motion of the club toward or away from the golfer.

It is a further object of the present invention to provide a shuttle for a golf swing training device that allows the club to rotate about the club shaft's longitudinal axis.

It is a further object of the present invention to provide a shuttle for a golf swing training device that provides rotation of the club's shaft about an axis that is parallel to an axis of the device's ring.

It is a further object of the present invention to provide a shuttle for a golf swing training device that provides rocking movement of the club relative to the device's ring.

It is a further object of the present invention, to provide a method for improving the accuracy of a golfer's shots.

It is a further object of the present invention to provide a shuttle that dissipates the static electricity resulting from the shuttle moving around the ring of a golf swing training device.

It is a further object of the present invention to provide a shuttle for guiding a golf club along the proper path of an individual's golf swing.

It is a further object of the present invention to provide a golf swing training device that analyses the position, speed, and direction of the golf club throughout the golfer's swing.

It is a further object of the present invention to provide a golf swing training device that can control the motion of a golfer's swing.

It is a further object of the present invention to provide a golf swing training device that allows a golfer the full range of motion corresponding to all phases of a golf swing.

It is a further object of the present, invention to provide a golf swing training device with a shuttle that moves along a ring to guide the golf club.

It is a further object of the present invention to provide a golf swing training device that can selectively increase the distance between a golfer's hands and a shuttle moveably mounted on a ring during the golfer's swing motion.

It is a further object of the present invention to provide a shuttle for a golf swing training device that can be easily removed from and reattached to a ring of the device.

It is a further object of the present invention to provide a method for perfecting a user's golf swing.

BRIEF DESCRIPTION OF THE DRAWINGS

Reference is made to the accompanying drawings in which are shown illustrative embodiments of the invention and from which novel features and advantages will be apparent.

FIG. 12A is a partial top view of the platform of the golf swing training device of FIG. 1. The sliding base plate is in the forwardmost position with the sliding adjuster assembly positioned at the highest ring height setting position as shown in FIG. 11A.

FIG. 12B is a partial top view of the platform of the golf swing training device of FIG. 1. The sliding base plate is in the rearwardmost position with the sliding adjuster assembly positioned at the lowest ring height setting as shown in FIG. 11B.

DETAILED DESCRIPTION

A full golf swing can be characterized by various stages which begin by addressing the ball with the club head and then include a takeaway, a backswing, top of the backswing, beginning of the downswing, downswing, contact with the ball and a follow-through, prior to starting a swing, a golfer will typically assume a stance in which he or she addresses the ball. When addressing the ball, the golfer generally sets his or her stance relative to the ball with the club in a position directly behind the ball. The takeaway is the initial segment of the swing when the club head is moved away from the ball. The backswing follows the takeaway and continues until the club head reaches the top of the backswing. At the top of the backswing, the movement of the club head stops and the direction of club head's movement is reversed. The downswing follows the backswing and begins when the movement of the club head has reversed direction from the backswing and is moving generally downwardly toward the ball. At the bottom of the downswing, the club head makes contact with the ball. After striking the ball, the club head continues to move forward in the follow-through.

Figure 1:
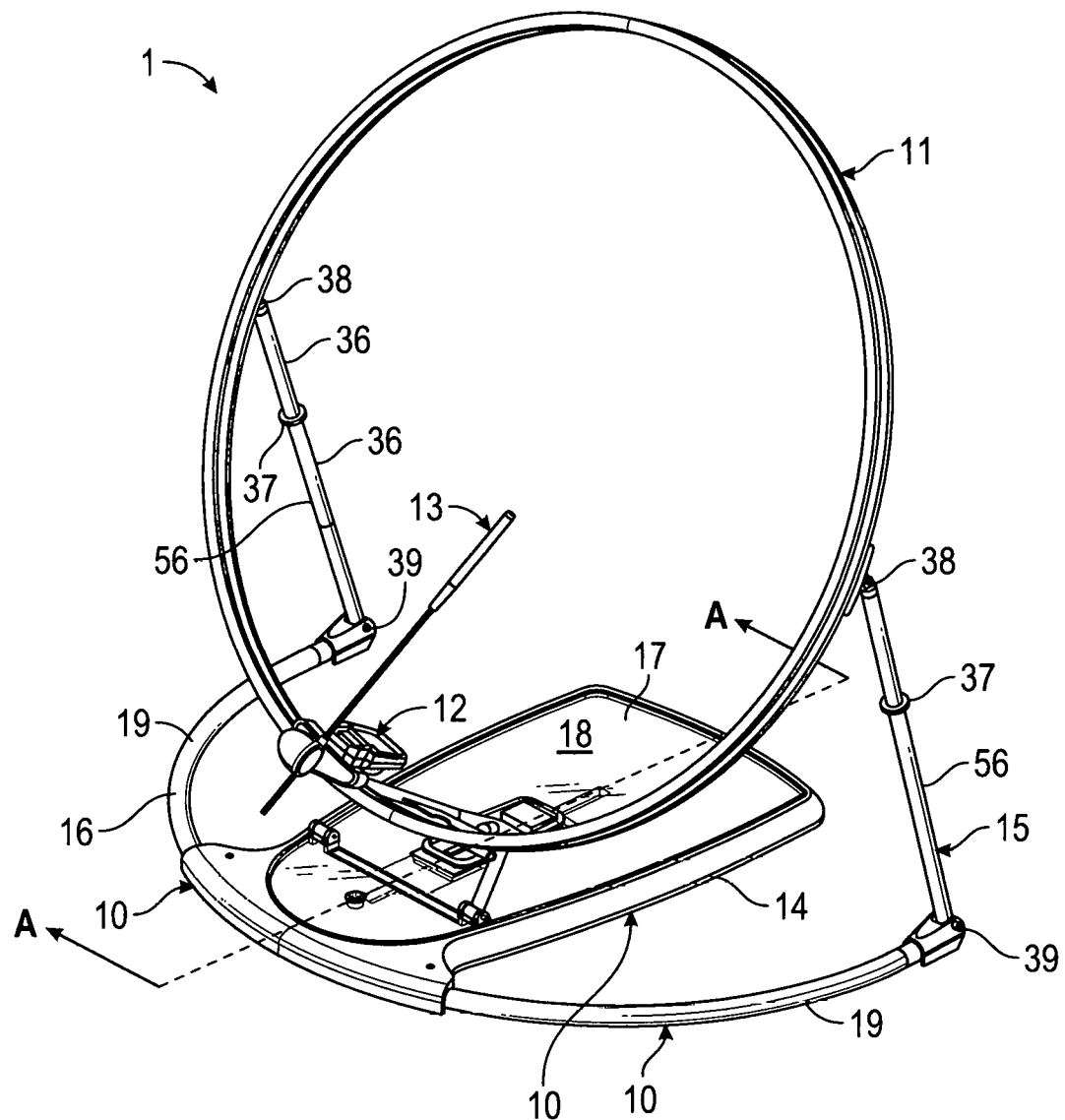
FIG. 1 is a perspective view of a preferred embodiment of the golf swing training device of the present invention.

The golf swing training device (1) as shown in FIG. 1 comprises a support base (10), a ring (11), a shuttle (12) and a club (13). The support base (10) supports the ring (11) at various adjustable positions. The shuttle (12) is moveably mounted on the ring (11) and the club (13) is moveably mounted on the shuttle (12).

In a preferred embodiment, the club (13) is a golf club or simulation thereof, but the swing training device (1) can be adapted to accommodate any of a variety of different swinging implements, including, but not limited to, tennis rackets, baseball bats and simulations thereof.

The support base (10) comprises a platform (14) and an adjustable support frame (15). The platform (14) is generally planar and includes a turf cover (17) and a support area (18) for supporting a person when using the golf swing training device (1).

Figure 2:
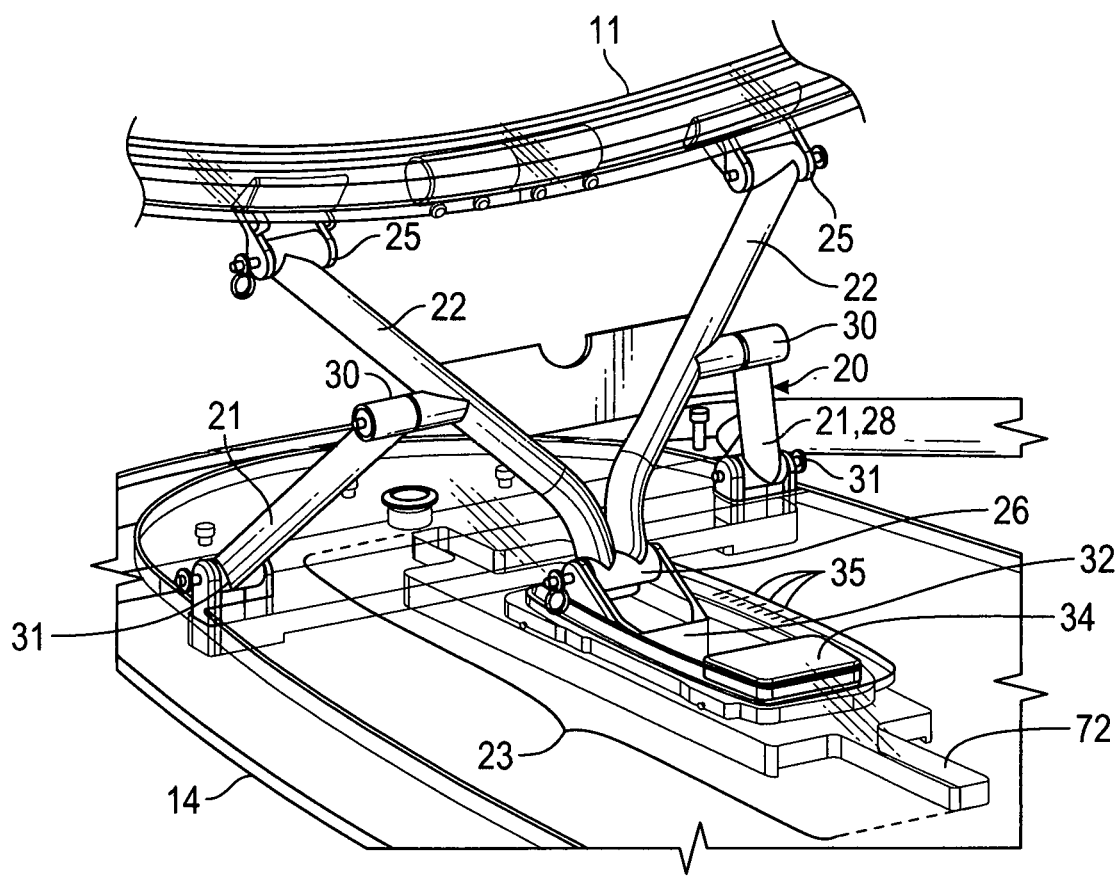
FIG. 2 is a partial perspective view showing the adjustable support frame of the golf swing training device of FIG. 1.
Figure 3:
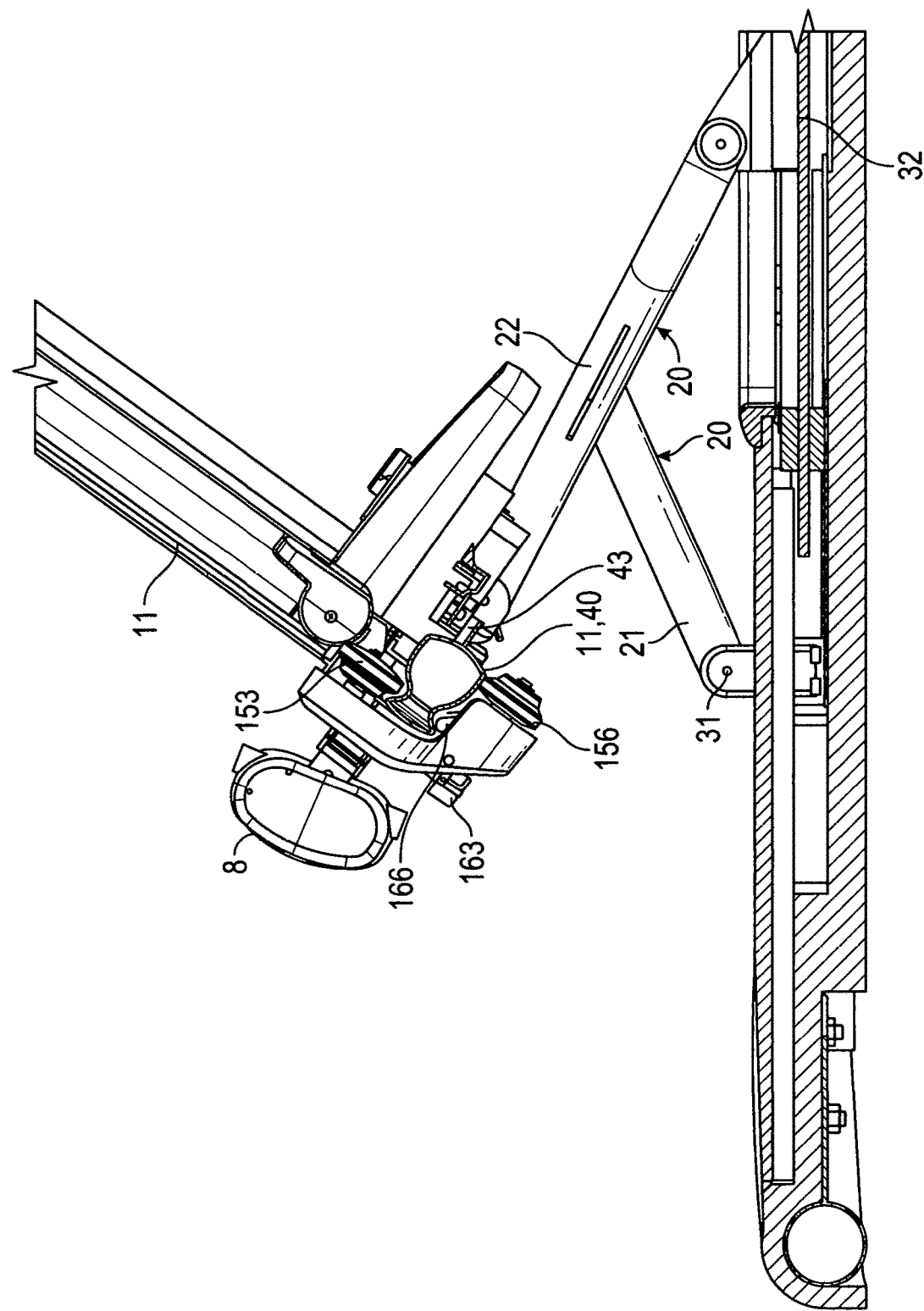
FIG. 3 is a partial cross-sectional side view of the golf swing training device taken along line A-A in FIG. 1.
Figure 11A:
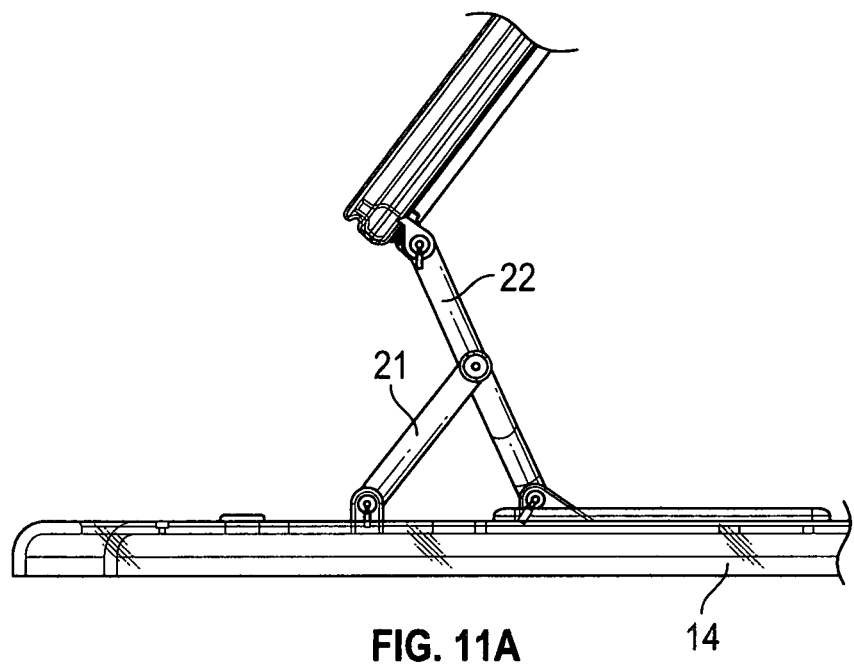
FIG. 11A is a partial side view of the golf swing training device of FIG. 1 showing the sliding adjuster assembly adjusted to the highest ring height setting.
Figure 11B:
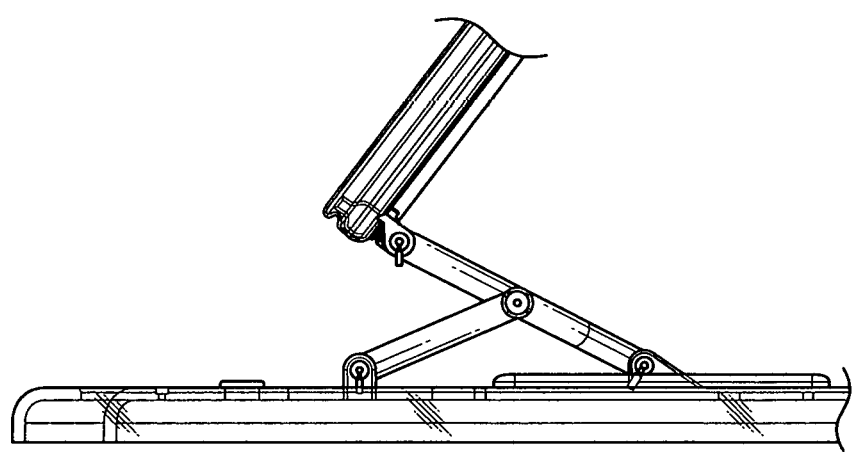
FIG. 11B is a partial side view of the golf swing training device of FIG. 1 showing the sliding adjuster assembly adjusted to the lowest ring height setting.
Figure 13:
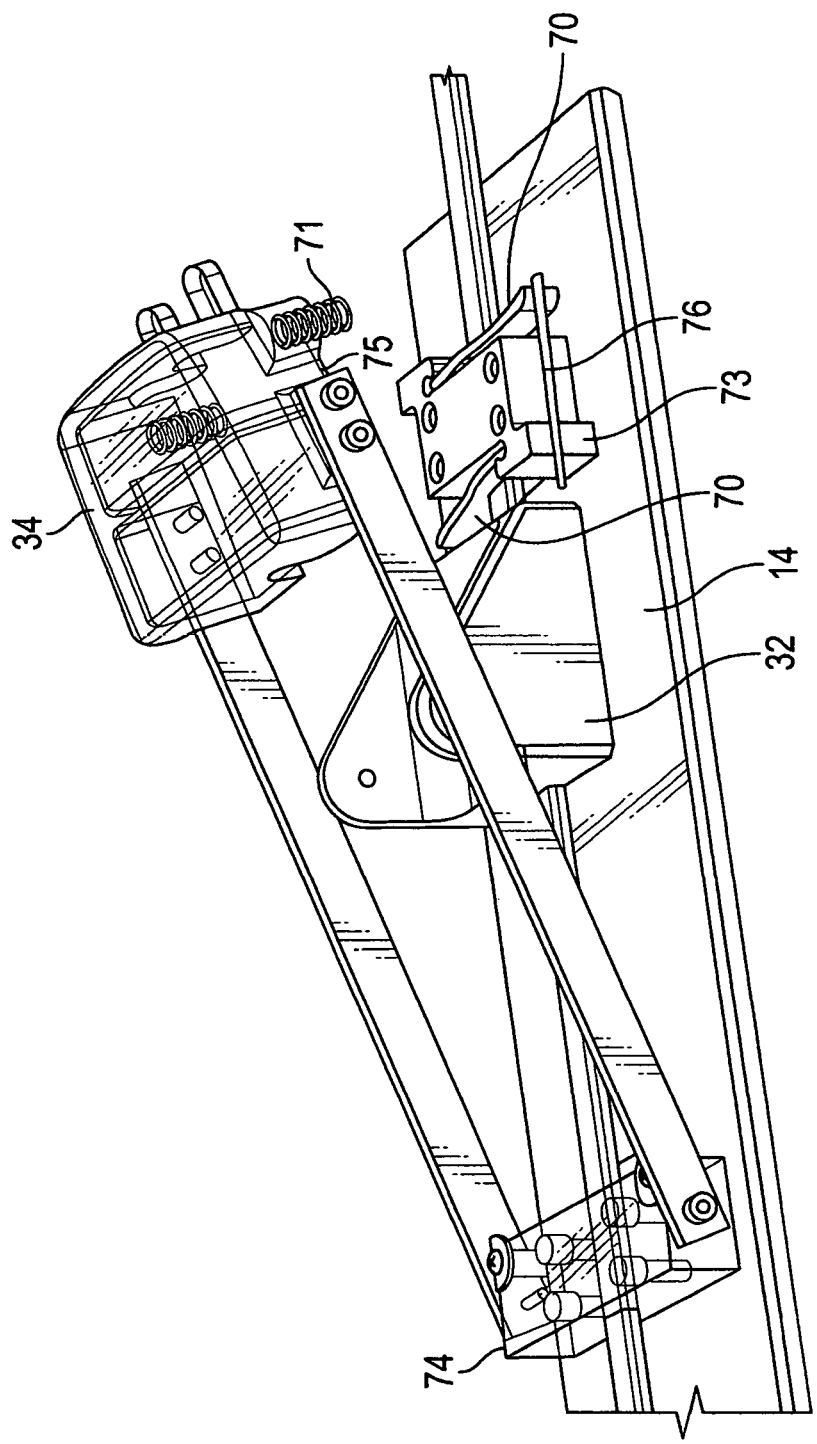
FIG. 13 is a partial exploded perspective view of the sliding adjuster assembly of the golf swing training device of FIG. 1 with the actuator lifted away from the platform to show the first support block.
Figure 14:
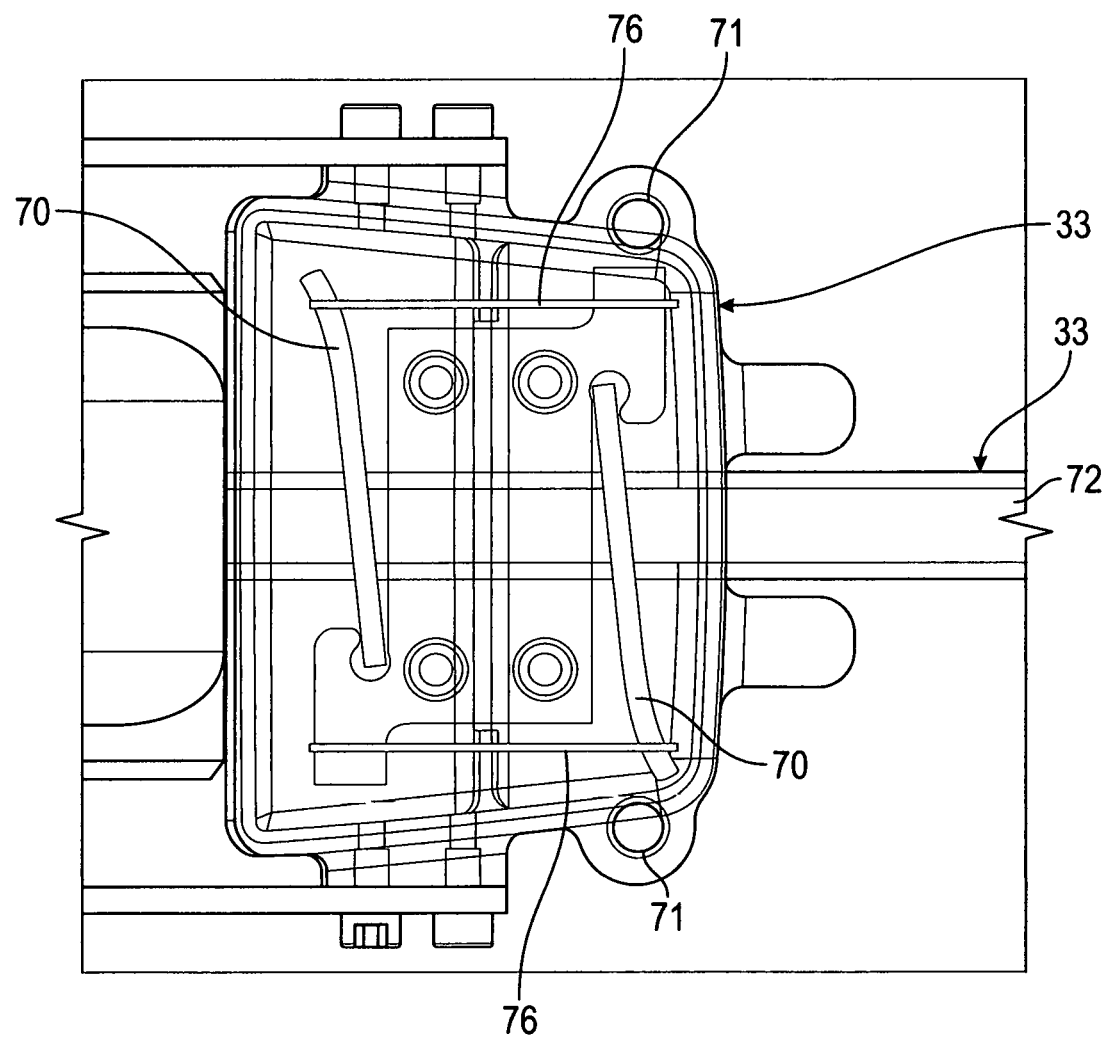
FIG. 14 is a partial top planar view of the sliding adjuster assembly of FIG. 13.

Referring to FIGS. 1, 2 and 3, the adjustable support frame (15) comprises a stabilizing arc (16), a ring prop (20) and a backstay (56). The stabilizing arc (16) comprises a pair of arcuately-shaped segments (19) that extend outwardly from a front side of the platform (14). The ring prop (20) extends between the platform (14) and a lowermost portion of the ring (11) and includes a clevis (21), a yoke (22) and a sliding adjuster assembly (23). The ring prop (20) supports the ring (11) at various selected angles and heights relative to the platform (14). The ring's height can range between a highest ring height setting as shown in FIG. 11A and a lowest ring height setting as shown in FIG. 11B.

The sliding adjuster assembly (23) includes a sliding base plate (32) and a plate lock (33), as shown in FIGS. 2, 12A, 12B, 13 and 14. The plate lock (33) includes a pair of clamp lock links (70), a lock bar (72), compression springs (71), a pair of tension wires (76), an actuator (34), a first support block (73) and a second support block (74). The actuator (34) includes a pair of ribs (75).

The lock, bar (72) is slideably mounted on the first (73) and second (74) support blocks. The support blocks (73, 74) support the lock bar (72) and also keep the lock bar (72) aligned and in position on the platform (14). The sliding base plate (32) is fixedly mounted on the lock bar (72) and moves with the lock bar (12).

The clamp lock links (70) are mounted on the first support block (73) and the lock bar (72) extends through each of the clamp lock links (70). The clamp lock links (70) are adapted to selectively engage the lock bar (72) in order to deter movement of the lock bar (72) on the platform (14). Each of the clamp lock links (70) can be moved, into a position against the lock bar (72) to secure the lock bar (72) against sliding movement on the support blocks (73, 74). Each of the tension wires (76) is attached between a respective clamp lock link (70) and the first support block (73).

When the clamp lock links (70) are engaged with lock bar (72), the sliding base plate (32) is locked against movement on the platform (14). To release the clamp lock links (70) from the lock bar (72), the actuator (34) is depressed against the force of the compression springs (71) and the ribs (75) on the actuator (34) are pushed against the tension wires (76) which in turn each release a respective clamp lock link (70) from engagement with the lock bar (72).

By releasing the clamp lock links (70) from engagement with the lock bar (72), the lock bar (72) and the attached sliding base plate (32) are allowed to move horizontally with respect to the platform (14). When the actuator (34) is released, the ribs (75) are moved away from the tension wires (76) and the clamp lock links (70) spring back into engagement with the lock bar (72) to lock the sliding base plate (32) against sliding on the platform (14).

The yoke (22) is generally Y-shaped, having a pair of arms extending divergently from a central stem. Each of the upper ends of the yoke (22) is pivotally attached to the ring (11) by a respective upper yoke pivot joint (25). On the opposite, lower end of the yoke (22), the central stem is pivotally attached to the sliding base plate (32) by a lower yoke pivot joint (26).

The clevis (21) is comprised by a pair of legs (28), each of which legs is pivotally connected at an upper end to the yoke (22) by a respective upper leg pivot joint (30). The lower end of each leg (28) is pivotally attached to the platform (14) by a respective lower leg pivot joint (31).

When the actuator (34) of the sliding adjuster assembly (23) is depressed, the plate lock (33) is released, thereby allowing the sliding base plate (32) to move horizontally in fore and aft directions on the platform (14). As the sliding base plate (32) is moved, the yoke (22) moves therewith. The lower end of the yoke (22) moves in accordance with the sliding base plate (32), while the upper end of the yoke (22) moves the ring (11). The upper end of the clevis (21) is raised or lowered according to the yoke's movement as the sliding base plate (32) is shifted.

As the sliding base plate (32) moves in a fore direction toward the front of the platform (14), the angle of the yoke (22) relative to the platform (14) increases and the ring (11) is progressively raised higher, as shown in FIG. 11A at the highest ring height setting. Conversely, as the sliding base plate (32) moves in an aft direction away from the front of the platform (14), the angle of the yoke (22) relative to the platform (14) decreases and the ring (11) is progressively moved lower, as shown in FIG. 11B at the lowest ring height setting.

As the sliding base plate (32) is moved on the platform (14), the yoke (22) and the clevis (21) move through angular orientations and the bottom of the ring (11) is raised and lowered, respectively, to adjust the ring (11) to a selected position. For each individual user, the ring (11) can be adjusted, to the appropriate position required for that user's proper swing. The sliding adjuster assembly (23) also can include adjustment indicia (35), shown in FIG. 2, that indicates the position of the sliding base plate (32) on the platform (14). The adjustment indicia (35) can be used to set particular predetermined adjustment settings for the ring's positions.

Backstays (56) of the adjustable support frame (15) as shown in FIG. 1 extend between the ring (11) and the platform (14). Each backstay (56) is adjustable and comprises a pair of telescoping rods (36). A respective upper rod pivotal joint (38) mounts an upper end of each of the telescoping rods (36) to opposite sides of the ring (11). A respective lower rod joint (39) fixedly mounts a lower end of each of the telescoping rods (36) to an end of a respective arcuately-shaped segment (19).

Each of the backstays (56) can be adjusted in length and includes a rod lock (37) to secure each pair of telescoping rods (36) at a selected length. Preferably, the rod lock (37) is a setscrew. However, other rod locking devices, such as a locking collar could be used in lieu of a setscrew. By changing the length of the telescoping rods (36), the angle of the ring (11), referred to as the swing plane angle, can be adjusted. The more the telescoping rods (36) are lengthened, the steeper the angle of the ring (11) will be, and conversely, the more the rods (36) are shortened, the flatter the angle will be. The swing plane angle can be indicated by an angle finder tool placed on the ring or an electronic angle indicator displayed on the shuttle (12).

Figure 5:
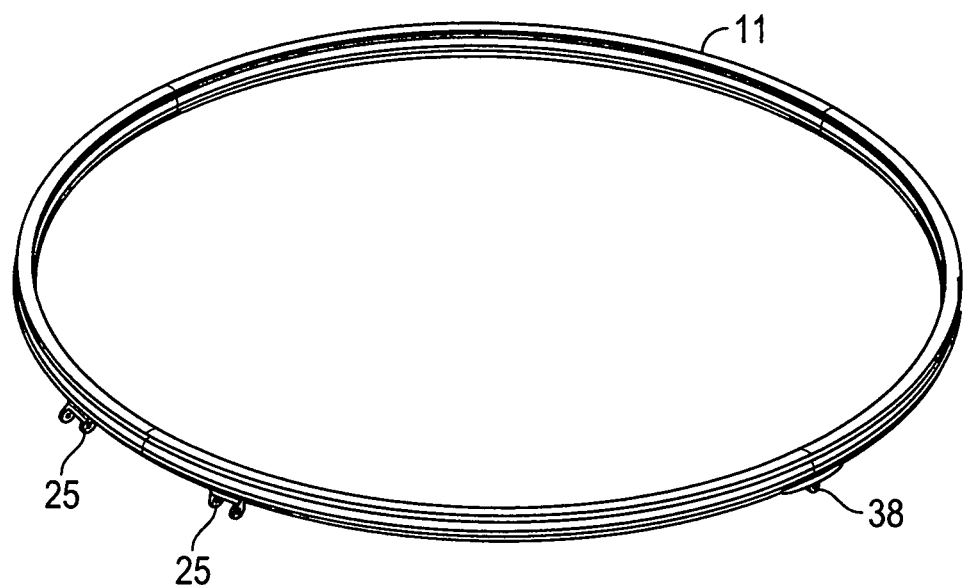
FIG. 5 is a perspective view of one preferred embodiment of the ring of the golf swing training device of FIG. 1.
Figure 6:
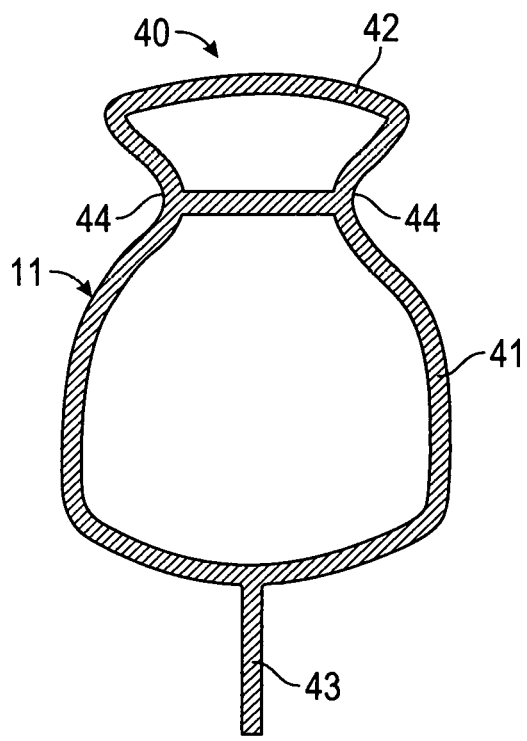
FIG. 6 is a cross-sectional view of the preferred embodiment of the ring shown in FIG. 5.

The ring (11), as shown in FIGS. 5 and 6, has a cross section (40) that is characterized by a main body (41), a flange (43) and a protrusion (42). The flange (43) and protrusion (42) are disposed on the main body (41) and are disposed opposite to each other. Both the flange (43) and the protrusion (42) extend along the ring's circumference. The flange (43) extends outwardly from the main body (41) and in a direction toward a center of the ring (11). The protrusion (42) extends away from the center of the ring (11). A pair of troughs (44) is formed at the base of the protrusion (42) on opposite sides of the ring's main body (41).

Figure 9A:
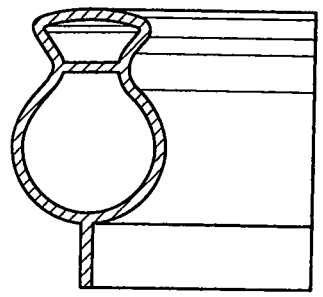
FIG. 9A is a cross-sectional view of a second preferred embodiment of the ring of the golf swing training device of FIG. 1.
Figure 9B:
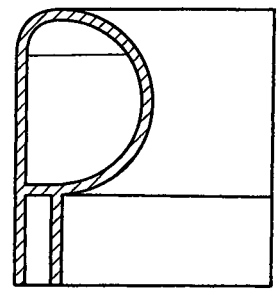
FIG. 9B is a cross-sectional view of a third embodiment of the ring of the golf swing training device of FIG. 1.
Figure 9C:
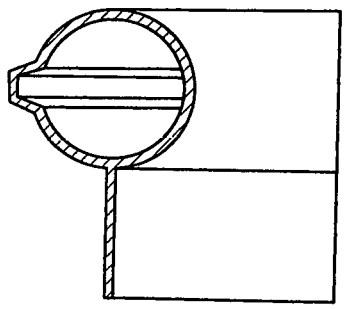
FIG. 9C is a cross-sectional view of a fourth embodiment of the ring of the golf swing training device of FIG. 1.

The ring (11) is a circular track. In a preferred embodiment, the ring (11) comprises four arcuate portions joined to form the continuous circular track. The ring's cross-section (40), as shown in FIG. 6, is one preferred embodiment. Other preferred embodiments of the cross-section are shown in FIGS. 9A-9C.

The ring prop (20) and backstays (56) combine to hold the ring (11) in place. The adjustability of the sliding base plate (32) and the telescoping rods (36) accommodate movement of the ring (11). Preferably, to prepare the golf swing training device for use, the height of the ring (11) is set first and then the swing plane angle is set.

In a preferred embodiment, the adjusting angle of the ring (11) relative to the support base (10) can range from approximately 50 to 90 degrees. In another preferred embodiment, the height of the ring (11) above the platform (14) can range from an uppermost value of approximately 15 inches to a lowermost value of approximately 8 inches.

Figure 4:
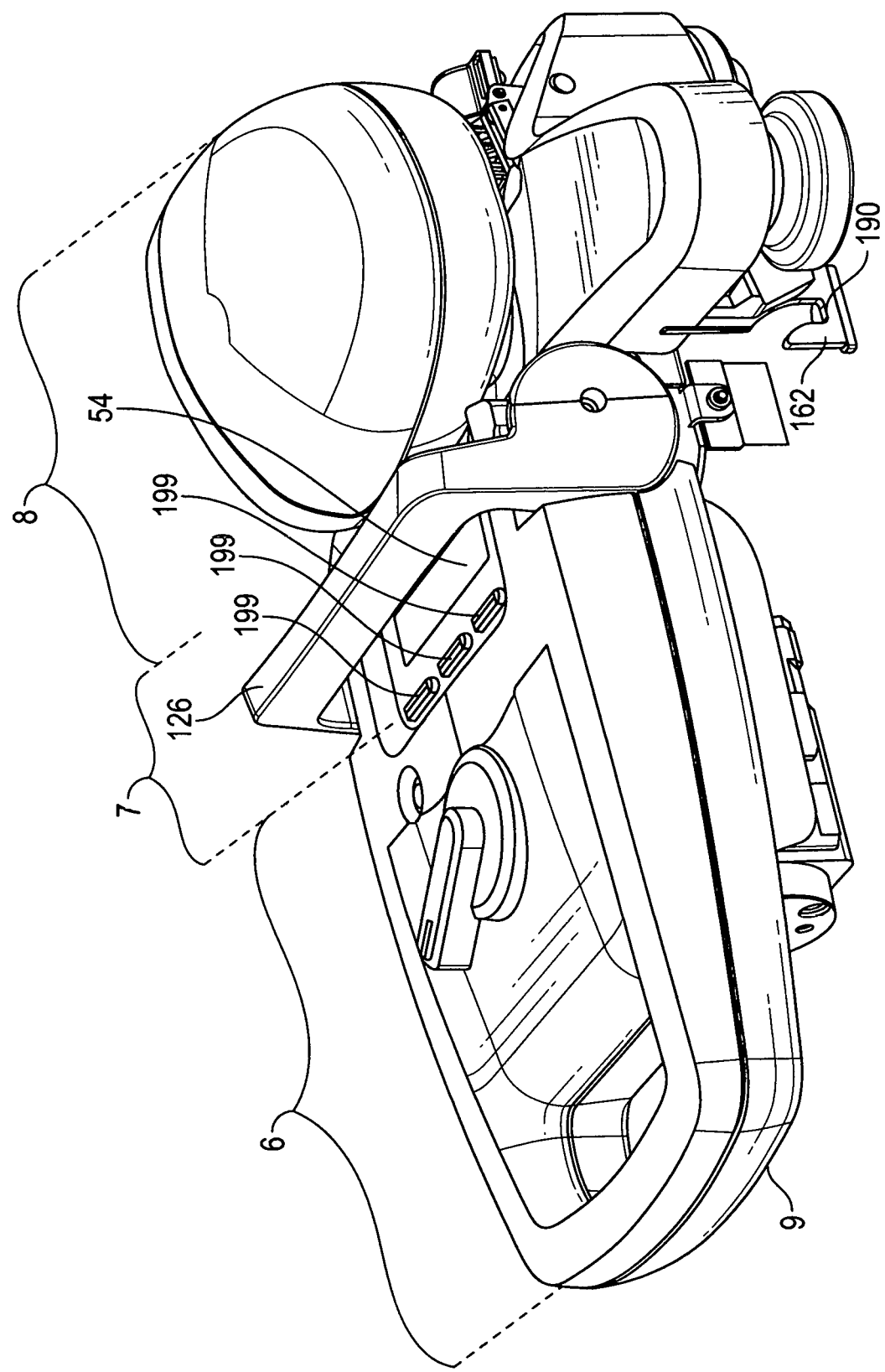
FIG. 4 is a perspective view showing the shuttle of the golf swing training device of FIG. 1.
Figure 7:
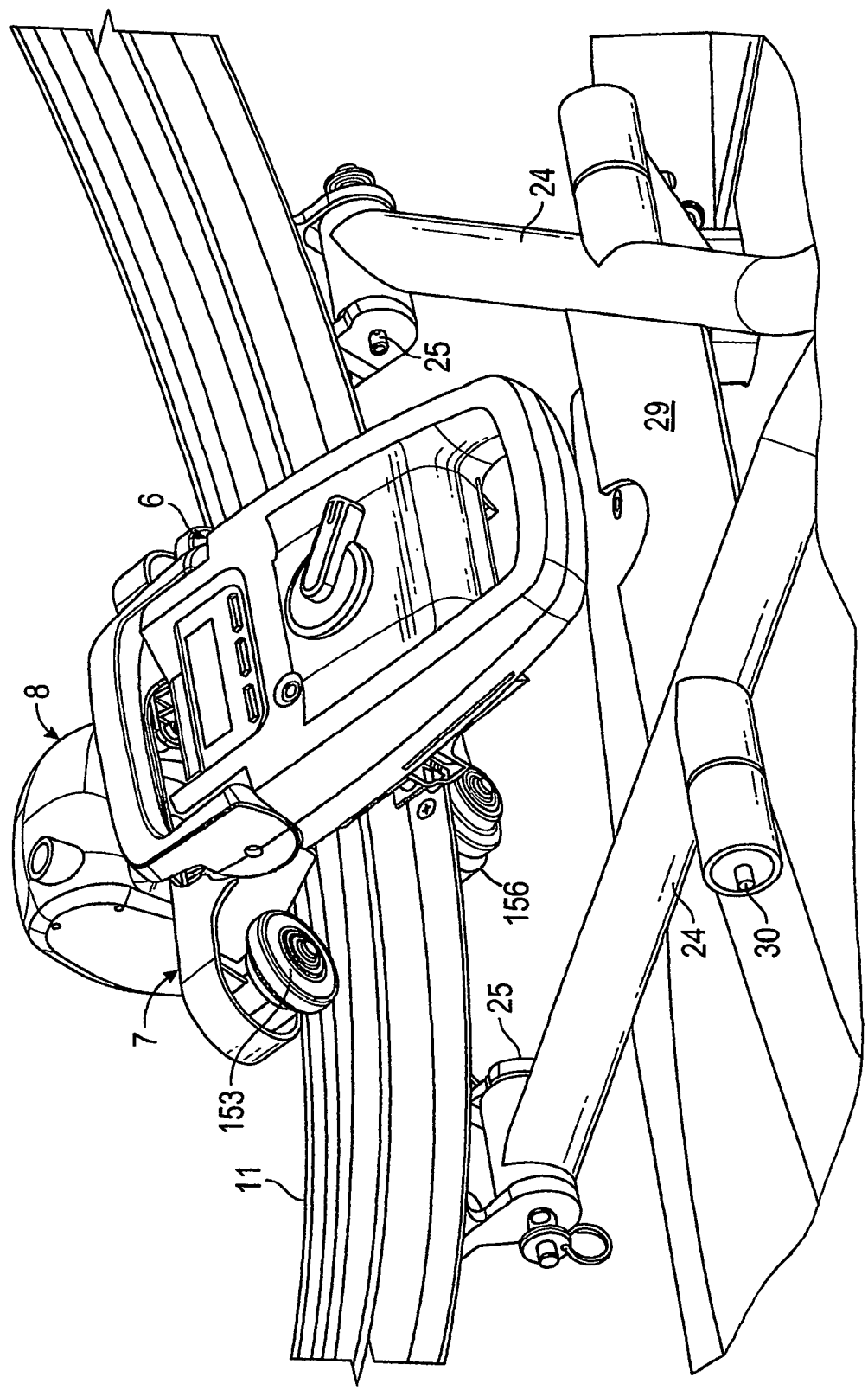
FIG. 7 is a partial perspective view showing the shuttle mounted on the ring of the golf swing training device of FIG. 1.
Figure 8:
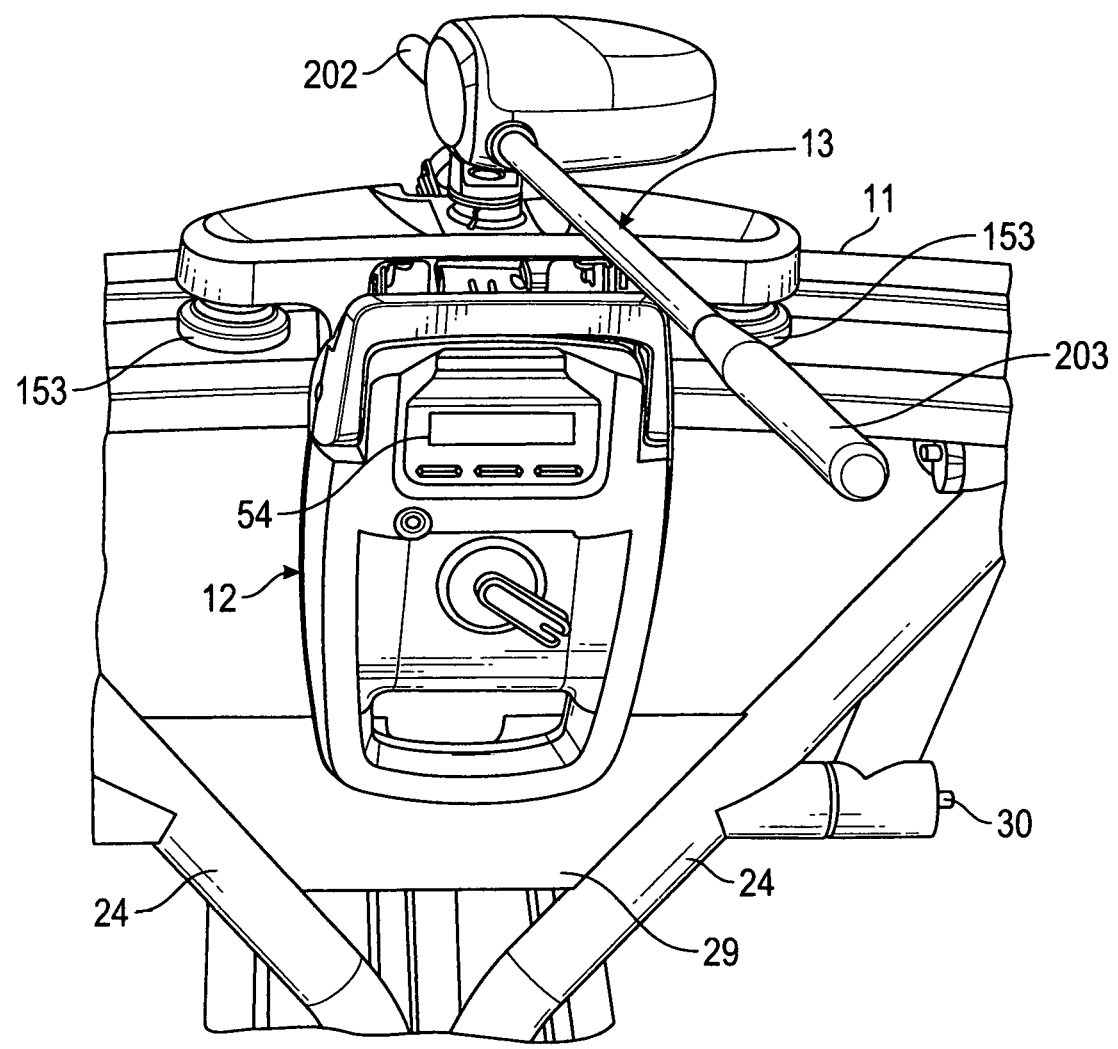
FIG. 8 is a partial perspective view of the golf swing training device of FIG. 1 showing a club attached to the shuttle mounted on the ring.

Referring to FIGS. 4, 7 and 8, the shuttle (12) comprises a housing subassembly (6), a frame subassembly (7), and a head subassembly (8).

Housing Subassembly

Figure 20:
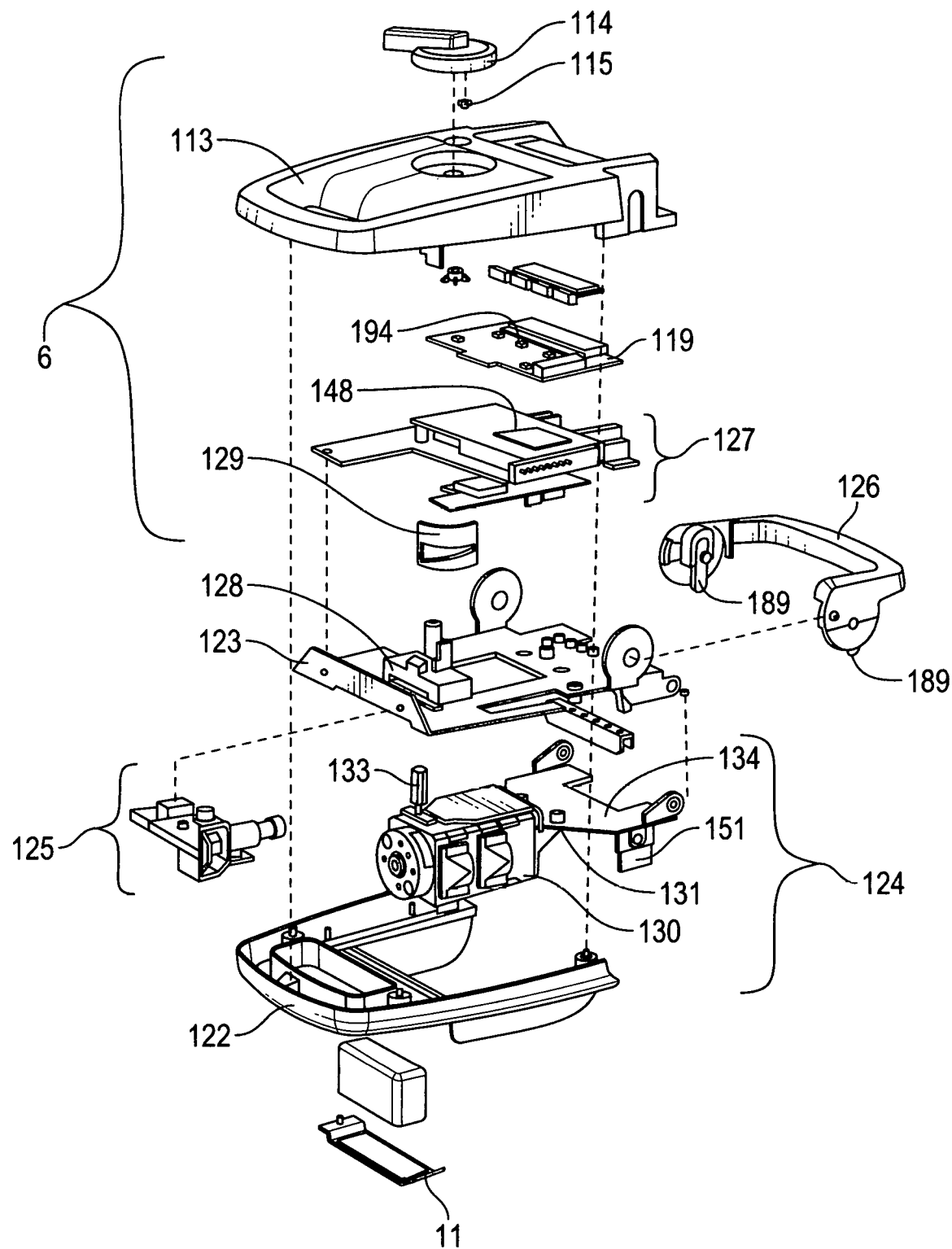
FIG. 20 is an exploded perspective view of the shuttle of the golf swing training device of FIG. 1.

The housing subassembly (6) as shown, in FIGS. 4 and 20 includes a shuttle front housing (113), a shuttle rear housing (122), a shuttle pivot chassis (123) and a shuttle handle (9).

Frame Subassembly and Means for Releasably Securing the Shuttle to the Ring

Figure 25:
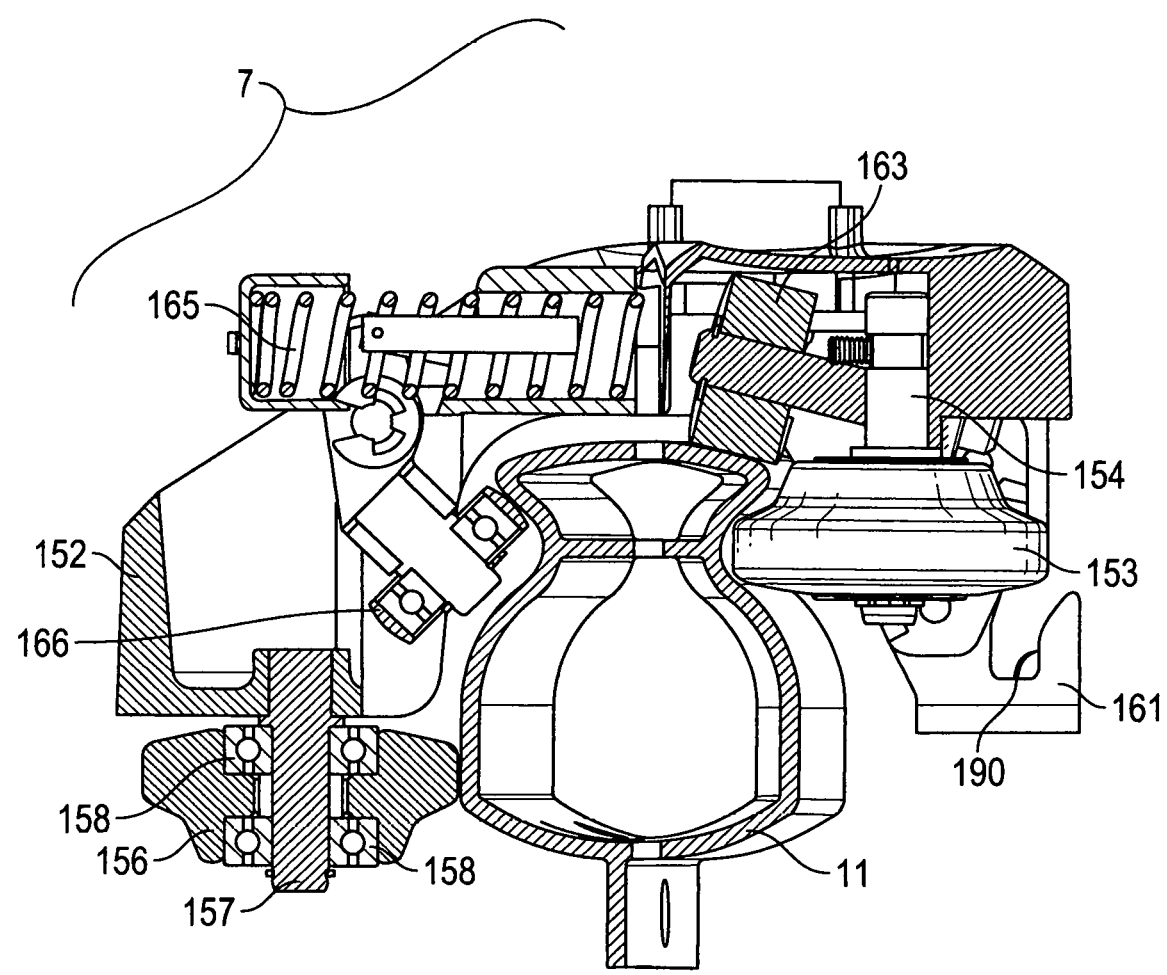
FIG. 25 is a cutaway side view of the frame subassembly of the golf swing training device of FIG. 1 mounted on the ring.
Figure 26:
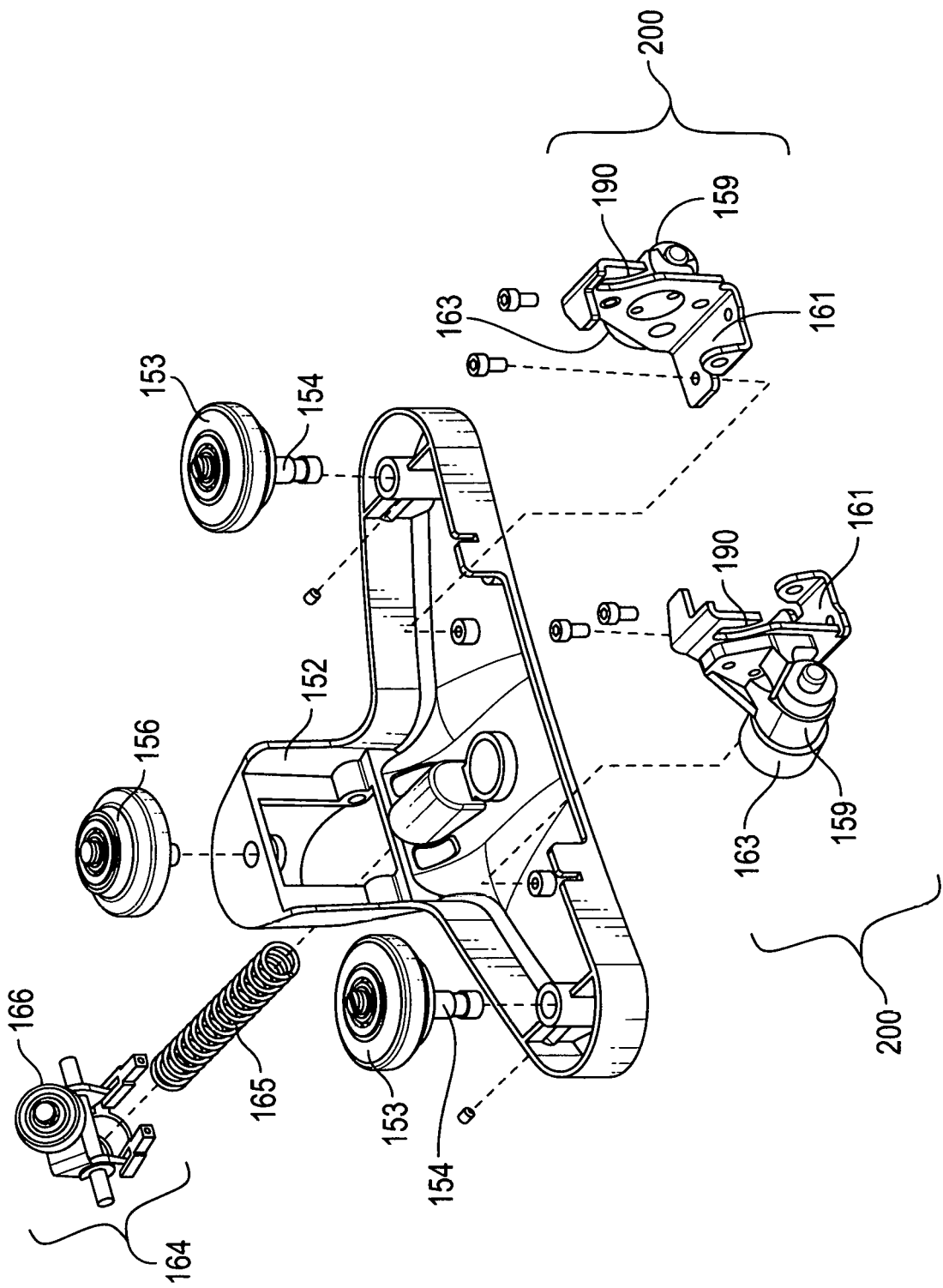
FIG. 26 is an exploded perspective view of the frame subassembly of the golf swing training device of FIG. 1.

The frame subassembly (7) includes means for releasably securing the shuttle to the ring. The means for releasably securing the shuttle to the ring as shown in FIGS. 25 and 26 comprises a plurality of rollers, including a front main roller (156), side main rollers (153), a pinch roller (166) and tracking rollers (163) mounted on a shuttle frame (152). Each of the rollers (156,153,163,166) is mounted to the shuttle frame (152) by precision bearings (158).

The rollers (156,153,163,166) ride along the ring (11) when the shuttle (12) is mounted on the ring (11). The positions of the rollers (156,153,163,166) act to facilitate movement of the shuttle (12) around the circumference of the ring (11). The precision bearings (158) provide a smooth rotation of the respective rollers (156,153,163,166).

With the shuttle (12) installed on the ring (11), the front main roller (156) is held against the outside diameter of the ring and the two side main rollers (153) are held within the troughs (44) on the inside diameter of the ring (11).

Each of the tracking rollers (163) is mounted on the shuttle frame (152) by a respective roller mount (159) and a respective latch bracket (161). The tracking rollers (163) contact a distal surface of the ring (11) only intermittently and counteract higher degrees of clockwise rotating tendencies of the shuttle (12) on the ring (11).

The pinch roller (166) is supported in a pinch roller assembly (164). The pinch roller assembly (164) is pivotally mounted onto the shuttle frame (152) and includes a pinch roller assembly spring (165). The pinch roller assembly spring (165) biases the pinch roller (166) against a surface of the ring (11) when the shuttle (12) is attached thereto. With the pinch roller (166) biased against a distal portion of the trough (44) on the outside diameter of the ring (11), the front main roller (156) and side main rollers (153) are maintained in constant rolling contact with the ring (11) and the shuttle (12) is maintained in proper orientation to the ring (11).

On the shuttle frame (152), the front main roller (156) is offset from the adjacent side main rollers (153). This arrangement acts to facilitate a smooth ride of the shuttle (12) along the ring (11) despite any variations in the cross-sectional shape and curvature of the ring (11) due to manufacturing variations or other reasons.

Figure 27:
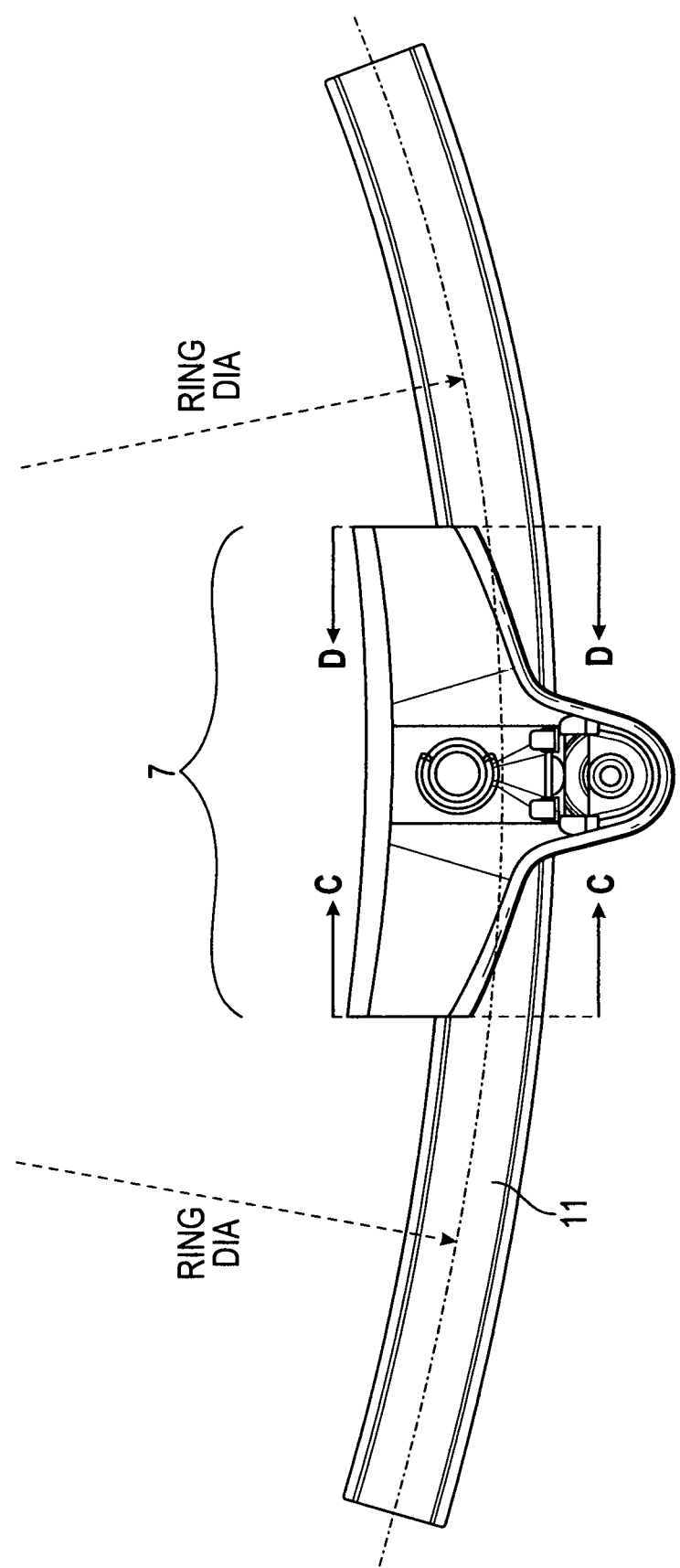
FIG. 27 is a diagrammatic drawing showing a partial enlarged top view of the frame subassembly mounted on the ring of the golf swing training device of FIG. 1.
Figure 28:
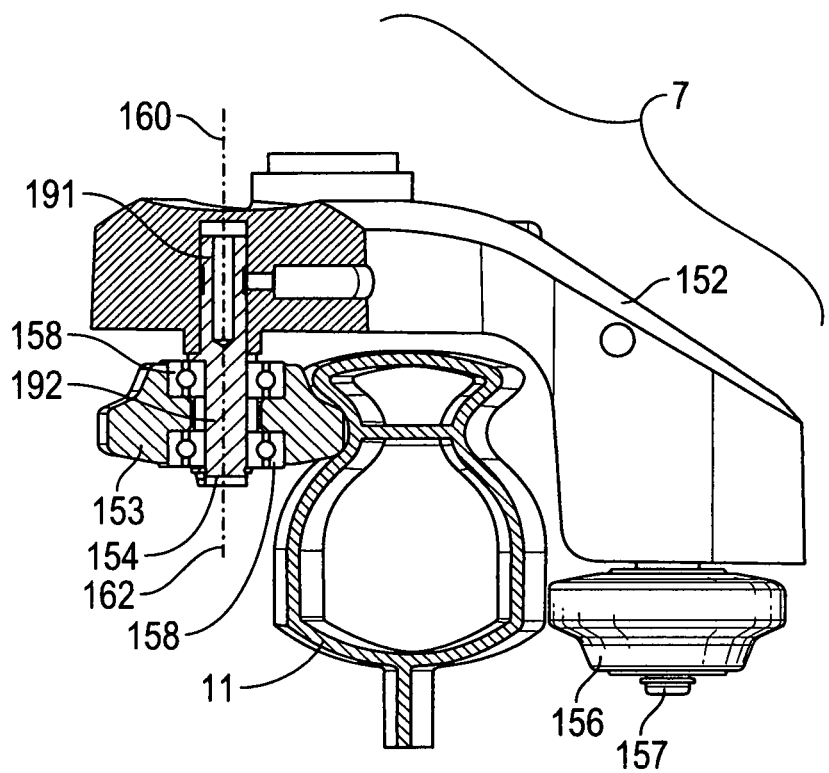
FIG. 28 is a cross sectional perspective side view of the frame subassembly mounted on the ring of the golf swing training apparatus, taken along line C-C of FIG. 27.
Figure 29:
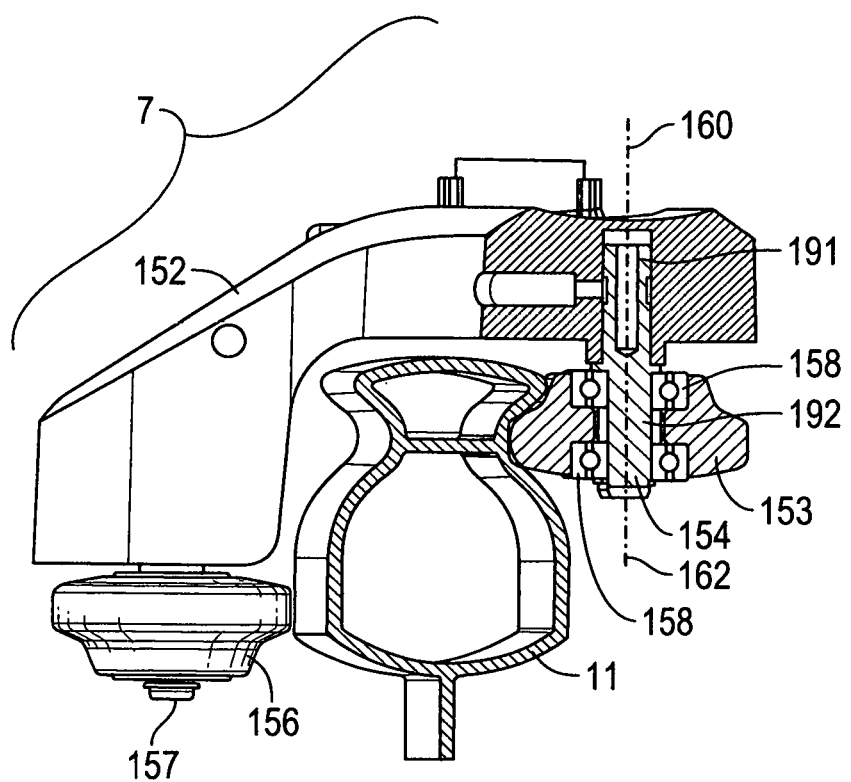
FIG. 29 is a cross sectional perspective side view of the frame subassembly mounted on the ring of the golf swing training apparatus taken along line D-D of FIG. 27.

To accommodate varying diameters of a ring (11), each of the two side main rollers (153) is mounted to the shuttle frame (152) by a respective axle (154) as shown in FIGS. 27, 28 and 29. Each of the axles (154) is characterized by a first (191) and second (192) axle portion. The first axle portion (191) has a first central axis (160) and the second axle portion (192) has a second central axis (162). The first (160) and second (162) central, axis are offset from each other so that the axles (154) are eccentrically mounted with respect, to the shuttle frame (152). Each axle (154) can be rotated on the shuttle frame (152) to increase or decrease a radial offset of the side main rollers (153) relative to the front main roller (156).

To accommodate smaller diameters of a ring (11), the second central axis (162) of each of the side main roller's axles (154) should be located a farther distance from the axis of the shaft (157) of the front main roller (156) as shown in FIGS. 27 and 29. Conversely, to accommodate larger ring diameters, the second central axis (162) of each of the side main roller's axles (154) should be positioned a closer distance to the axis of the shaft (157) of the front main roller (156) as shown in FIGS. 27 and 28.

This arrangement of the rollers (156,153,163,166) on the shuttle frame (152) ensures that the shuttle (11) will roll smoothly around the ring's perimeter, while compensating for any manufacturing variations in the cross-sectional shape and curvature of the ring (11). Also the main rollers (156, 153) function to maintain continuous contact with the ring (11) as the shuttle moves therealong and to maintain proper orientation of the shuttle (12) on the ring (11). The frame subassembly (7) enables the shuttle (12) to be attached to differently sized rings of varying diameters, while maintaining rolling contact between the main rollers (156,153) and the ring (11) during use.

In a preferred embodiment, the ring (11) is made front aluminum and each of the rollers (156,153,163,166) is comprised of urethane. However, other suitable materials could be used instead of aluminum and urethane for the ring (11) and rollers (156,153,163,166), respectively.

Means for Analyzing Position, Speed and Direction

The golf swing training device (1) further comprises means for analyzing position, speed and direction of the shuttle on the ring. Referring to FIGS. 20-24, the means for analyzing position, speed and direction of the shuttle comprises a rotary encoder (125), and a microprocessor (148) disposed within the housing subassembly (6). The microprocessor (148) is mounted on a motherboard assembly (127) and electrically connected thereto. The motherboard assembly (127) is mounted on the shuttle pivot chassis (123). The rotary encoder (125) is pivotally mounted on the shuttle pivot chassis (123) via a pivot pin (140) and mounting block (139). The microprocessor (148) appropriately interprets the signals sent from the rotary encoder (125).

The rotary encoder (125) includes an encoder frame (138), an encoder shaft (136), an encoder roller (135), an encoder wheel (141), an encoder sensor printed circuit board (142), a compression spring (144) and a home sensor printed circuit board (145). The compression spring (144) biases the encoder frame (138) and hence the encoder roller (135) toward the ring (11) so that the encoder roller (135) maintains contact with the ring (11) at all times. The frame subassembly (7) facilitates maintaining the encoder roller (135) in constant contact with the ring (11).

(1) Position

The encoder roller (135) and encoder wheel (141) are mounted on the encoder shaft (136). The encoder shaft (136) is mounted on the encoder frame (138) via bearings (137). Consequently, when the encoder roller (135) rolls along the ring (11), the encoder shaft (136) and the encoder wheel (141) also rotate. For each revolution of the encoder roller (135) there is a corresponding rotation of the encoder wheel (141).

The encoder sensor printed circuit board (142) is attached to the encoder frame (138) below the encoder wheel (141) and the encoder roller (135). A first Hall effect sensor (143) is mounted on the encoder sensor printed circuit board (142) and is proximate the encoder wheel (141).

The encoder sensor printed circuit board (142) is attached to the motherboard assembly (127) and the microprocessor (148) by a cable harness (not shown). The encoder wheel (141) further includes alternating magnetic poles (not shown).

To determine the position of the shuttle (12) on the ring (11), the alternating magnetic poles on the encoder wheel (141) prompt the first Hall effect sensor (143) to send pulses to the microprocessor (148). Each pulse corresponds to a fixed distance that the shuttle (12) and encoder roller (135) have traveled along the ring (11) in relation to the ratio of the circumference of the encoder wheel (141) to the circumference of the encoder roller (135).

By continuously monitoring the rotary encoder (125), the microprocessor (148) can determine the position of the shuttle (12) at all locations on the ring (11) at any time during the golfer's swing.

(2) Speed

The speed of the shuttle (12) is determined by the microprocessor (148). By calculating the time between the pulses from the encoder sensor printed circuit board (142) on the rotary encoder (125), the microprocessor (148) determines the rate of rotation of the encoder wheel (141). The rate of rotation of the encoder wheel (141) indicates the speed of the shuttle (12).

(3) Direction

The direction of the shuttle's movement on the ring (11) can be determined by the golf swing training device (1) at any given time during the golfer's swing. The first Hall effect sensor (143) of the rotary encoder (125) is arranged in quadrature. The pulse sequence from the encoder sensor printed circuit board (142) is sent to the microprocessor (148) and is used to determine the direction of rotation of the encoder roller (135) that indicates the direction of the shuttle's movement on the ring (11).

Means for Recalibrating the Microprocessor

Figure 23:
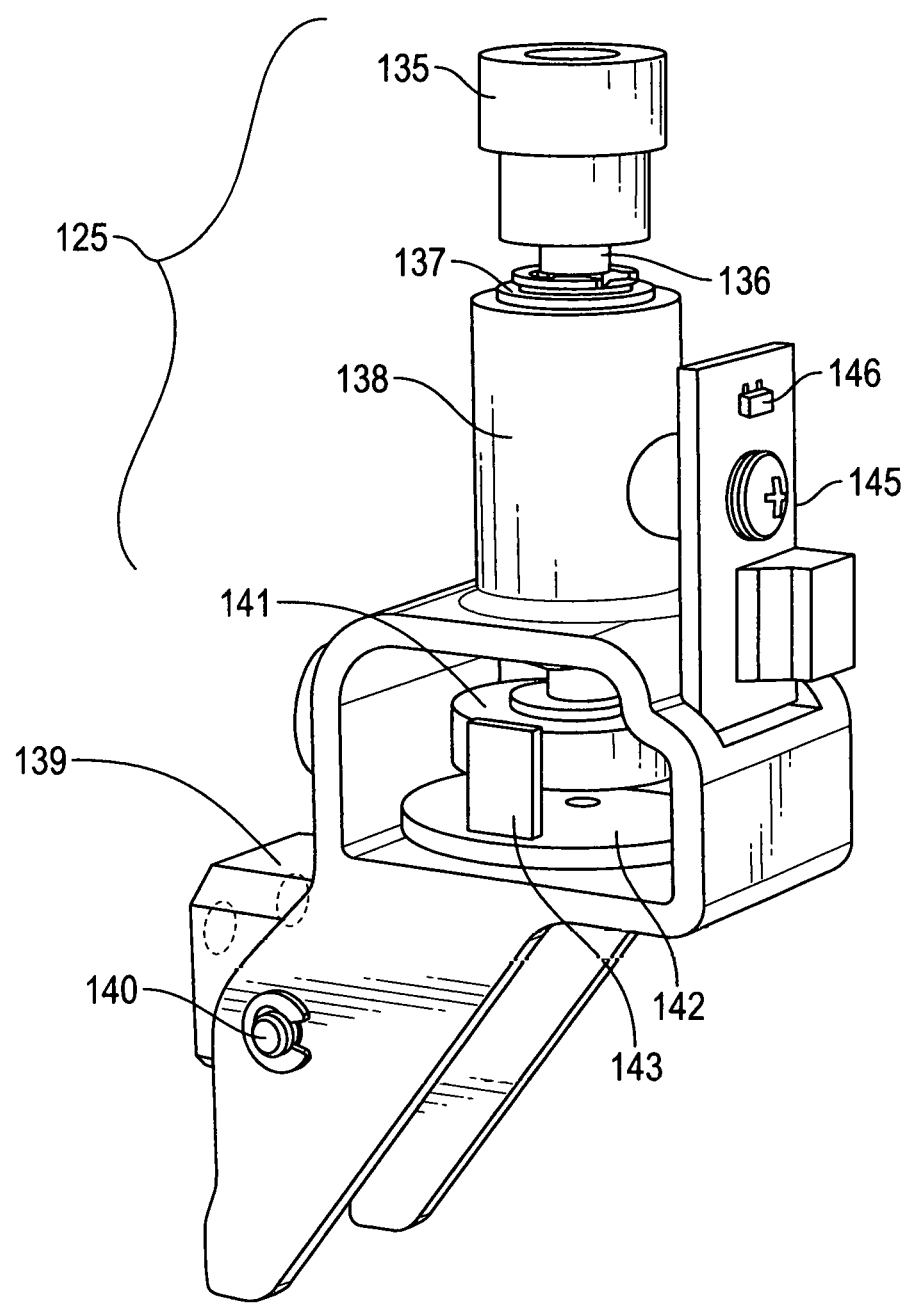
FIG. 23 is a perspective view of the rotary encoder of the golf swing training device of FIG. 1.
Figure 24:
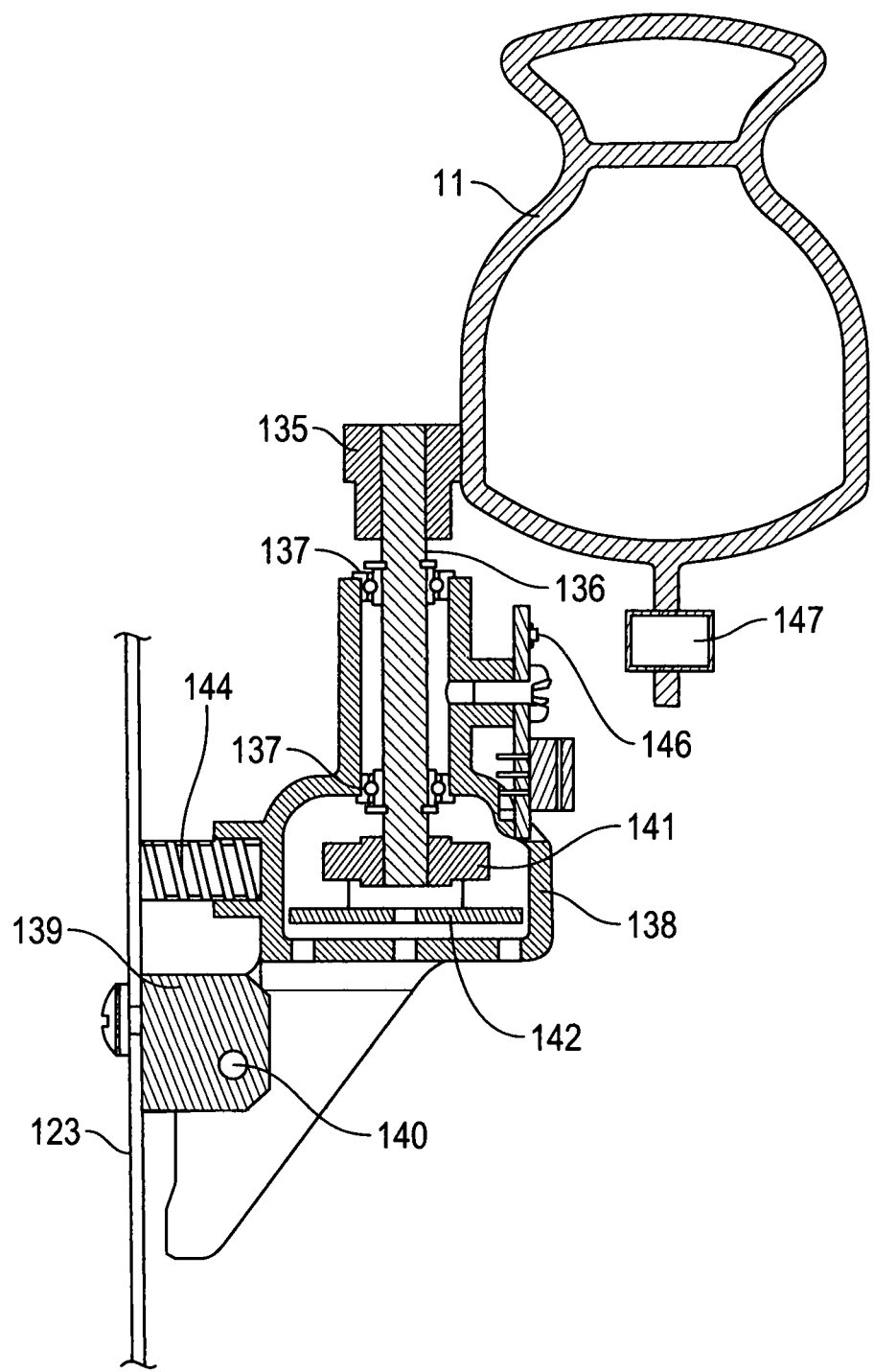
FIG. 24 is a cutaway side view of the rotary encoder shown in FIG. 23.

The golf swing training device (1) further comprises means for recalibrating the microprocessor in determining the position of the shuttle (12). The means for recalibrating the microprocessor comprises a second Hall effect sensor (146) and a recalibration magnet (147). The second Hall effect sensor (146) is mounted on the home sensor printed circuit board (145) as shown in FIGS. 23 and 24. The recalibration magnet (147) is mounted on the ring (11) at a desired location, preferably at the lowermost point of the swing or at the six o-clock position.

To recalibrate the microprocessor (148), the second Hall effect sensor (146) is activated when the shuttle (12) passes the recalibration magnet (147). The microprocessor (148) is prompted to compare its position to the known fixed position of the recalibration magnet (147) on the ring (11) and then recalibrates to account for any accumulated error in determining its position during a golfer's swing.

Means for Applying Variable Resistance to Shuttle Movement

Referring to FIGS. 20, 21, 30 and 31, the golf swing training device (1) further comprises means for applying a variable resistance to movement of the shuttle along the ring. The means for applying a variable resistance to movement of the shuttle along the ring is a shuttle resistance mechanism (124) that provides a resistance force that opposes the rolling motion, of the shuttle (12) along the ring (11).

The shuttle resistance mechanism (124) is pivotally attached to the shuttle pivot chassis (123) via a motor support frame (134) within the housing subassembly (6). In addition, the shuttle resistance mechanism (124) is electrically connected with the microprocessor (148) on the motherboard assembly (127).

The shuttle resistance mechanism (124) includes a resistance motor (130) configured as a generator, a resistance roller (131), a resistance engagement linkage (133) and a static wicking brush (151).

In the preferred embodiment, the resistance motor (130) provides the resistive force. However, other suitable means modulated for variable resistance using microprocessor control and electro-mechanical components could be used to provide resistance to the movement of the shuttle (12) around the ring (11) instead. Such other suitable means include friction brakes and eddy current brakes.

Figure 31:
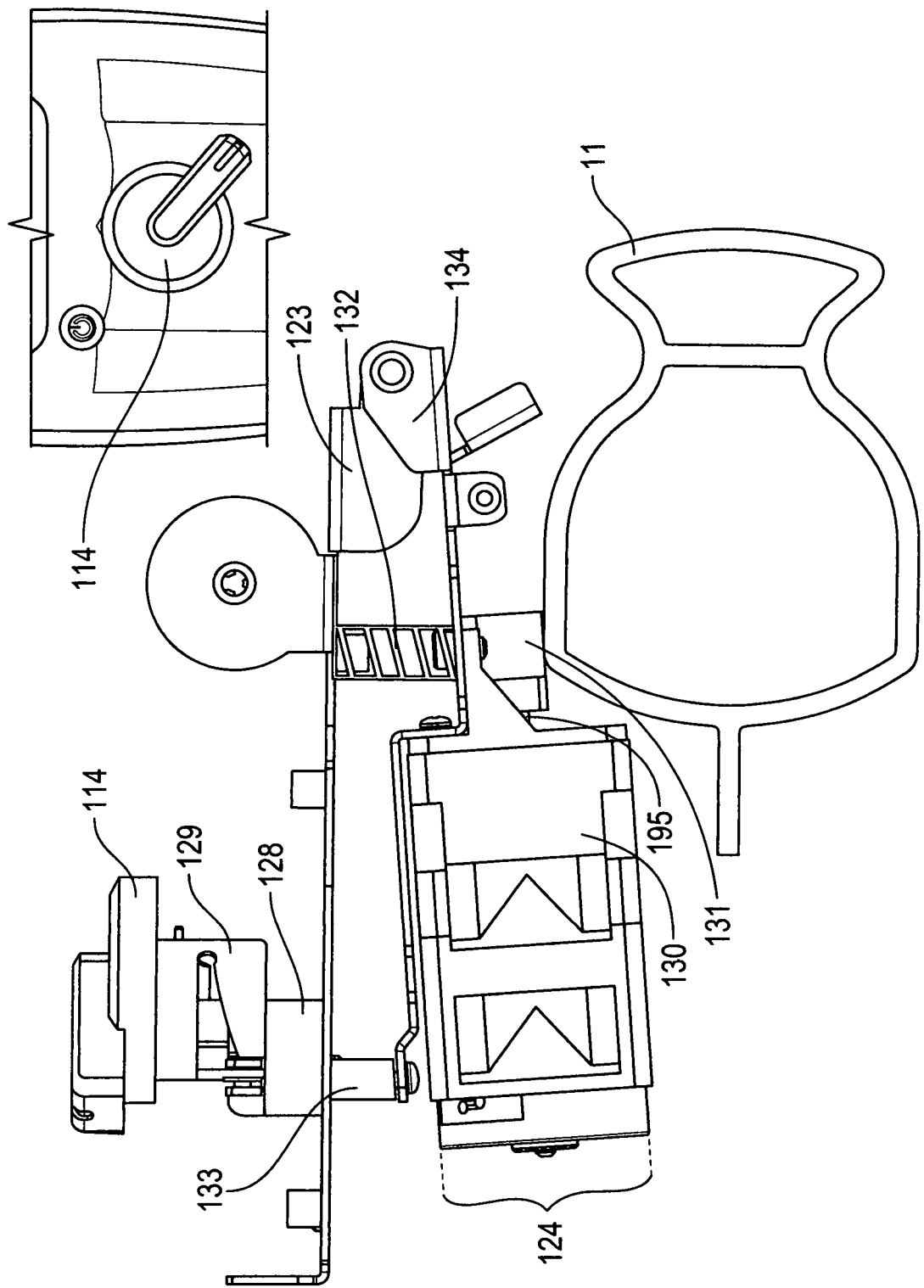
FIG. 31 is a partial cutaway view of the shuttle resistance mechanism of the golf swing training device of FIG. 1, wherein the resistance roller is engaged with the ring.

In FIG. 31, the resistance roller (131) is shown attached to the resistance motor (130) and held in rolling contact with the surface of the ring (11). The resistance roller (131) is attached to the resistance motor rotor (195) of the resistance motor (130). The resistance roller (131) spins the resistance motor rotor (195) as the shuttle (12) moves around the perimeter of the ring (11) by action of the club (13) swinging. As the resistance motor rotor (195) turns, a resisting force in direct opposition to the motion of the shuttle (12) is produced as an electrical current in the windings of the resistance motor (130). This effect is known as back electromotive force (EMF).

Figure 22:
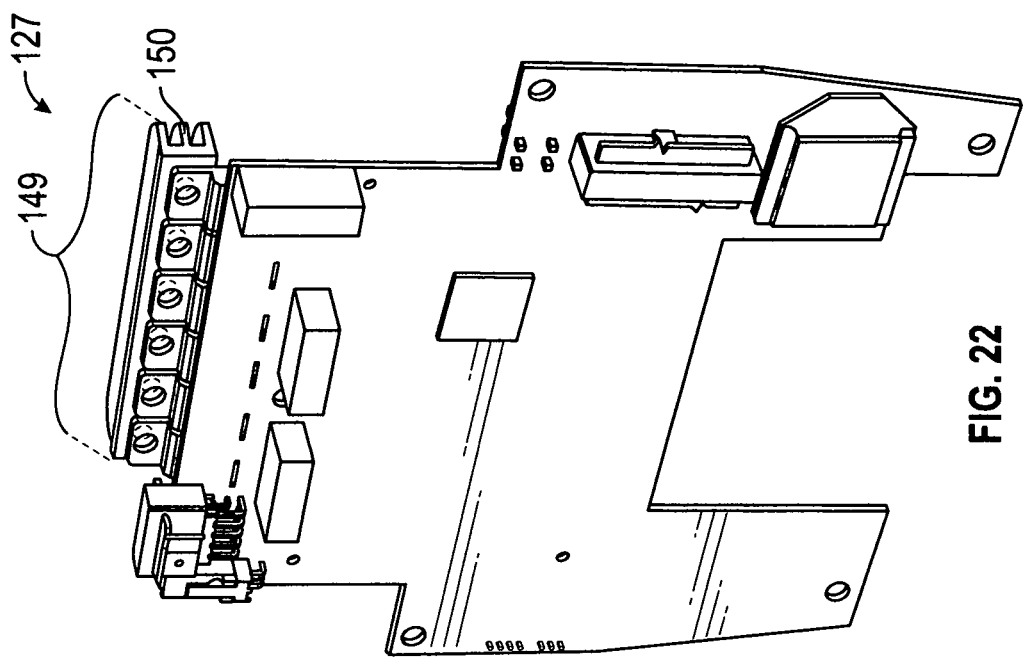
FIG. 22 is a perspective view of the motherboard assembly of the golf swing training device of FIG. 1.
Figure 21:
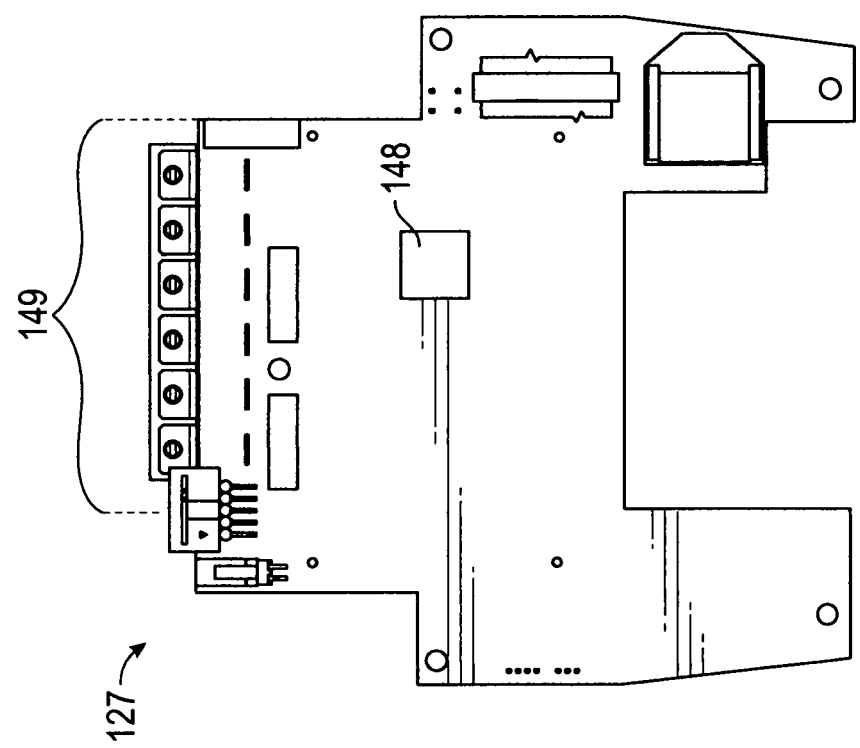
FIG. 21 is a planar view of the motherboard assembly of the golf swing training device of FIG. 1.

The resistance motor (130) includes outputs that are connected to an electrical circuit comprising a field-effect transistor (FET) bridge (149) as shown in FIGS. 21 and 22. The FET bridge (149) shunts the flow of the generated electrical current to ground. The mechanical energy of the resistance motor (130) that results from the resistance roller (131) spinning against the ring (11) is converted to electrical potential (e.g., voltage) which is shorted through the FET bridge (143) and converted to thermal heat. The thermal heat is dissipated into the air through a heat sink (150). By varying the amount of electrical current that is shunted through the FET bridge (149), the amount of mechanical resistance applied to the shuttle (12) can be varied. The microprocessor (148) on the motherboard assembly (127) sends a pulse width modulated signal to the FET bridge (149) to control the amount of generated electrical current that is shunted.

When the electrical load does not vary, a resistance is created that is in direct proportion to the speed at which the shuttle (12) moves as the club (13) is swung. In this preferred embodiment, the variable change in resistance felt by the golfer is more suitable to the golfer's training routine.

The preferred embodiment allows a golfer to select a number of training routines, each of which varies resistance throughout the different phases of the user's golf swing. With shuttle (12) having means for analyzing position, speed and direction of the shuttle's motion throughout a golfer's swing, many unique training routines can be devised for using the golf swing training device (1).

Figure 30:
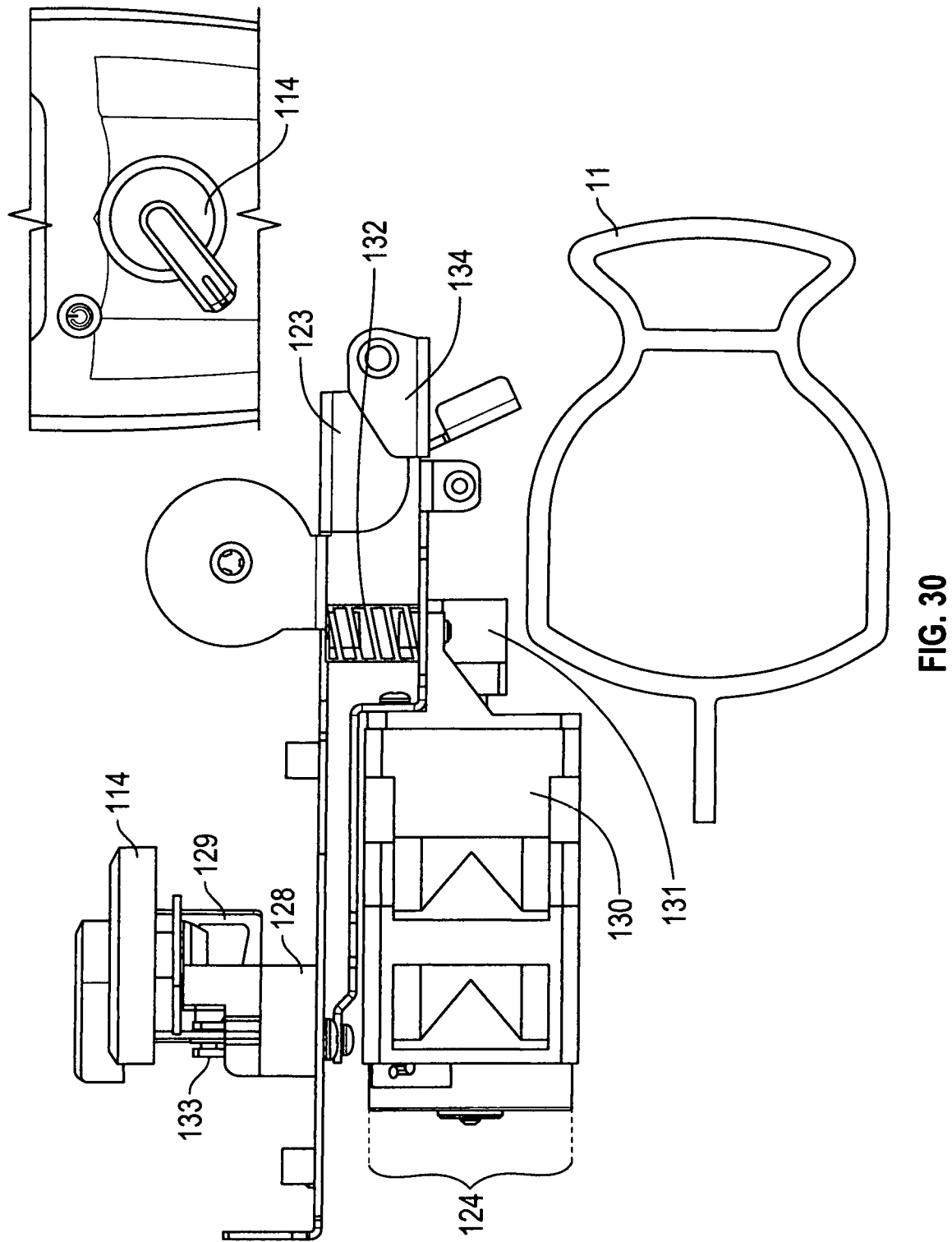
FIG. 30 is a partial cutaway view of the resistance mechanism, of the golf swing training device of FIG. 1, wherein the resistance roller is disengaged from the ring.

The shuttle resistance mechanism (124) connects with means for engaging or disengaging the resistance roller from the ring. The means for engaging or disengaging the resistance roller from the ring (11) comprises the resistance engagement linkage (133), as shown in FIGS. 20, 30 and 31, and further comprises a cam plate (129), an engagement knob (114), a resistance sensor magnet (115), a stabilizer block (128), and a resistance biasing spring (132).

The resistance engagement linkage (133) is attached to the motor support frame (134) that is pivotally attached to the shuttle pivot chassis (123) in the housing subassembly (6) and extends through the stabilizer block (128) to the cam plate (129). The cam plate (129) has a triangular-shaped profile cutout that forms a cam path. The resistance engagement linkage (133) is positioned to ride along the cam path of the profile cutout. The cam plate (129) is attached to the engagement knob (114) and rotationally locked thereto. The resistance sensor magnet (115) is positioned on an underside of the engagement knob (114). When the engagement knob (114) is rotated, the resistance sensor magnet (115) passes over a resistance Hall effect sensor (194) on the display assembly (119), signaling to the microprocessor (148) the position of the engagement knob (114).

When the engagement knob (114) is rotated, the cam plate (129) rotates therewith. As the cam plate (129) rotates, the resistance engagement linkage (133) rides along the cam path. As the resistance engagement linkage (133) rides along the cam path, the resistance engagement linkage (133) either pushes the motor support frame (134) away from the shuttle pivot chassis (123) thereby engaging the resistance roller (131) with the ring (11) as shown in FIG. 31 or the resistance engagement linkage (133) pulls the motor support frame (134) toward the shuttle pivot chassis (123), thereby disengaging the resistance roller (131) from, the ring (11) as shown in FIG. 30. The resistance biasing spring (132) is disposed between the shuttle pivot chassis (123) and the motor support frame (134). The resistance biasing spring (132) biases the resistance roller (131) toward the ring (11) so that when the resistance engagement linkage (133) pushes the motor support frame (134) away from the shuttle pivot chassis (123), the resistance roller (131) is biased to engage the ring (11). Consequently, when the engagement knob (114) is positioned to correspond to engagement of the resistance roller (131) with the ring (11), the resistance biasing spring (132) maintains the contact between the resistance roller (131) and the ring (11) by deterring the resistance engagement linkage (133) from separating away from the cam path on the cam plate (129).

When the engagement knob's position corresponds with the engagement of the resistance roller (131) with the ring (11), the force required by the golfer to move the shuttle assembly (12) around the ring (11) is influenced by the inertia of the spinning resistance motor (130). When the engagement knob's position corresponds with disengagement of the resistance roller (131) from, the ring (11), the force required to move the shuttle (12) around the ring (11) is lessened.

The resistance motor (130) drives the resistance roller (131) that may be disposed against the ring (11). When the shuttle (12) reaches a preselected location on the ring (11), the microprocessor (148) signals the shuttle resistance mechanism (124) to apply a desired resistance to the movement of the shuttle (12) via the resistance roller (131).

The amount of resistance applied by the shuttle resistance mechanism (124) to the shuttle (12) arid club (13) can be constant or varied throughout the swing. In a preferred embodiment, the magnitude of resistance applied to the shuttle (12) during the swing is varied. In other preferred embodiments, the resistance ceases at a certain point in the follow-through or the resistance pulses at the appropriate position to simulate a ball strike. It is noted that the resistance can be preselected for various other effects.

In one preferred embodiment, the resistance motor (130) is a stepper motor, but a suitable brushed or brushless motor could be used instead.

The magnitude of the frictional resistance can be varied and is preferably preselected according to the specific user's needs. As the magnitude of the frictional resistance is increased by the resistance roller (131) against the ring (11), the force required to advance the shuttle (12) along the ring (11) increases, thereby increasing the strength required to swing the club (13). Conversely, as the magnitude of the frictional resistance is decreased, the required strength to swing the club (13) decreases.

Head Subassembly

Figure 18:
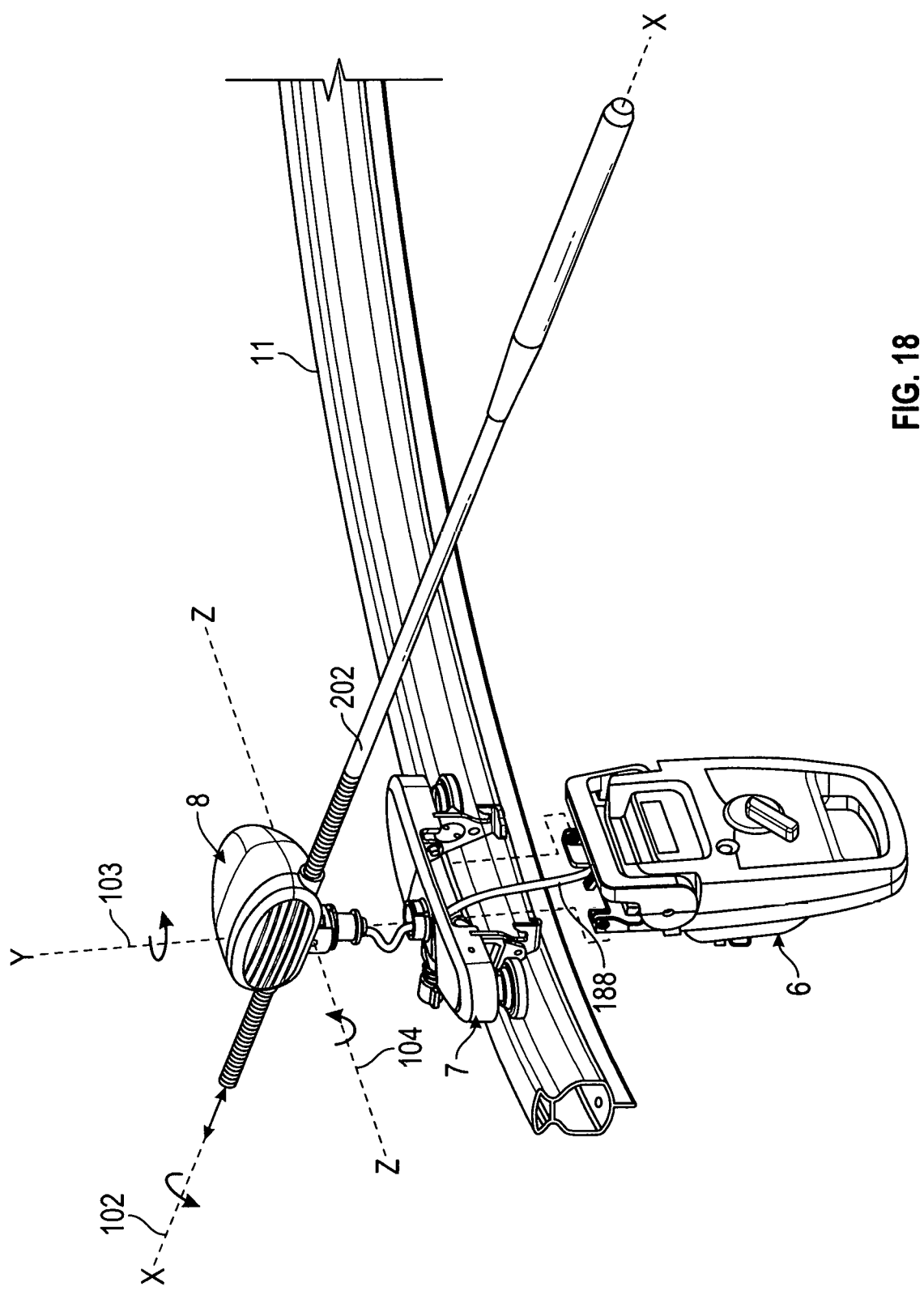
FIG. 18 a partial exploded view of the shuttle, golf club and ring of the golf swing training device of FIG. 1 showing the four degrees of movement of the club.
Figure 32:
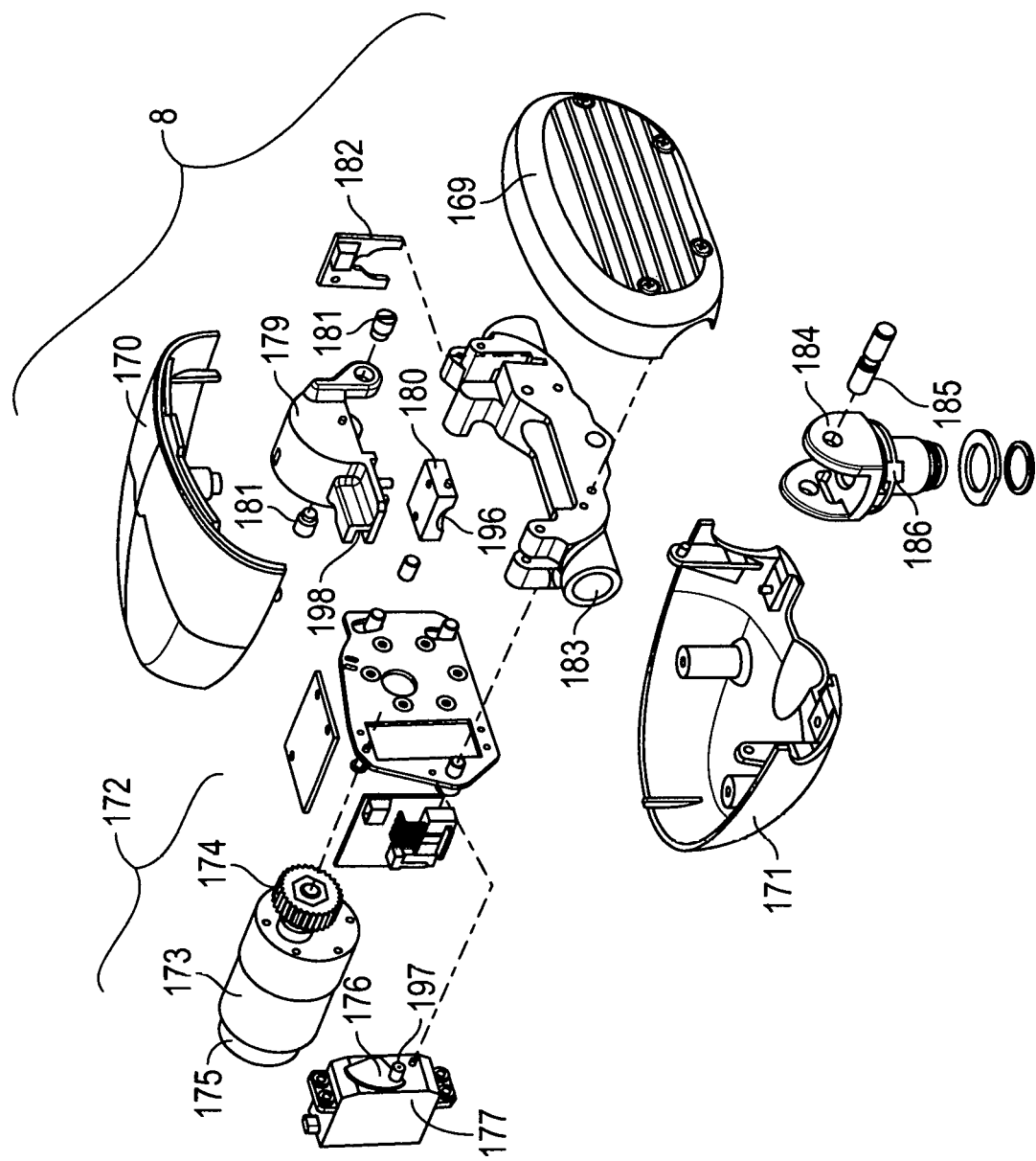
FIG. 32 is an exploded perspective view of the head subassembly of the golf swing training device of FIG. 1.
Figure 33:
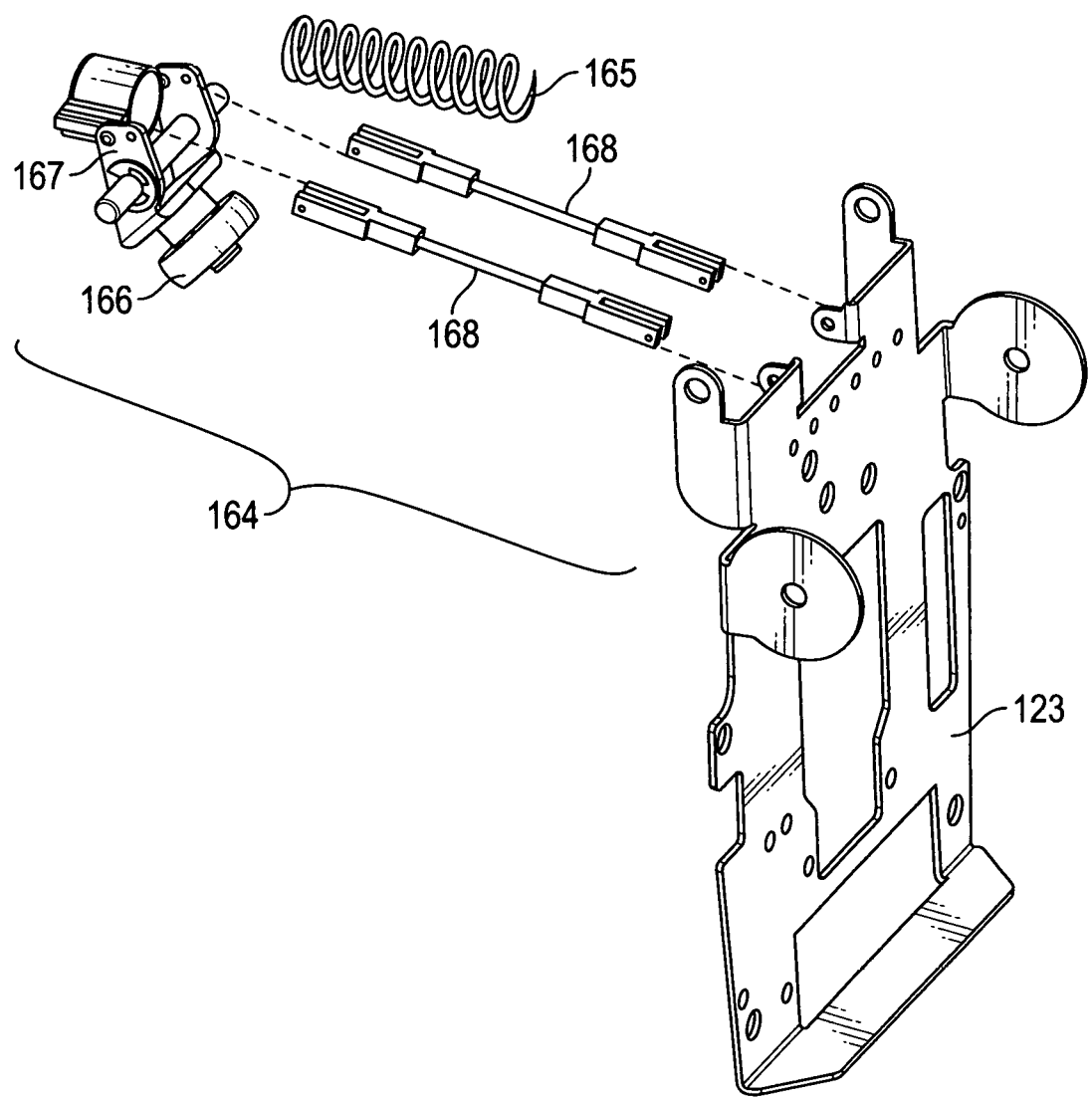
FIG. 33 is an exploded view of the pinch roller assembly and pivot chassis of the golf swing training device of FIG. 1.

Referring to FIGS. 18 and 32, the head subassembly (8) comprises three outer housings that simulate the visual appearance of a golf club's head. The three outer housings include a head front housing (169), a back top housing (170) and a back bottom housing (171). The head front housing (169) represents the face of a golf club that is adapted to contact the golf ball during a swing.

Figure 17A:
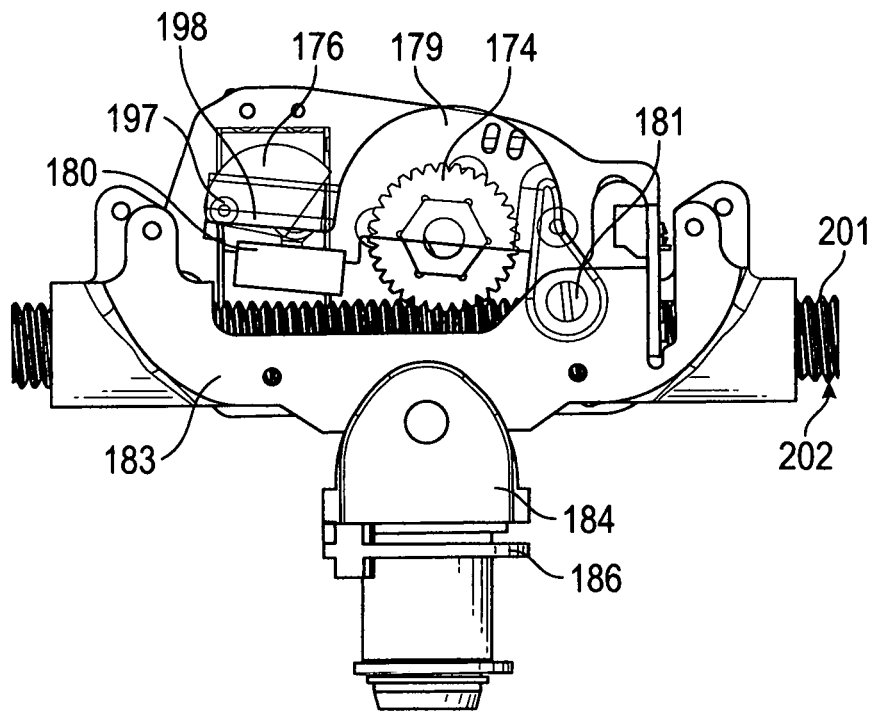
FIG. 17A is a partial cutaway perspective view of the shuttle of the golf swing training device of FIG. 1, wherein the lock rack is disengaged from the club shaft.
Figure 17B:
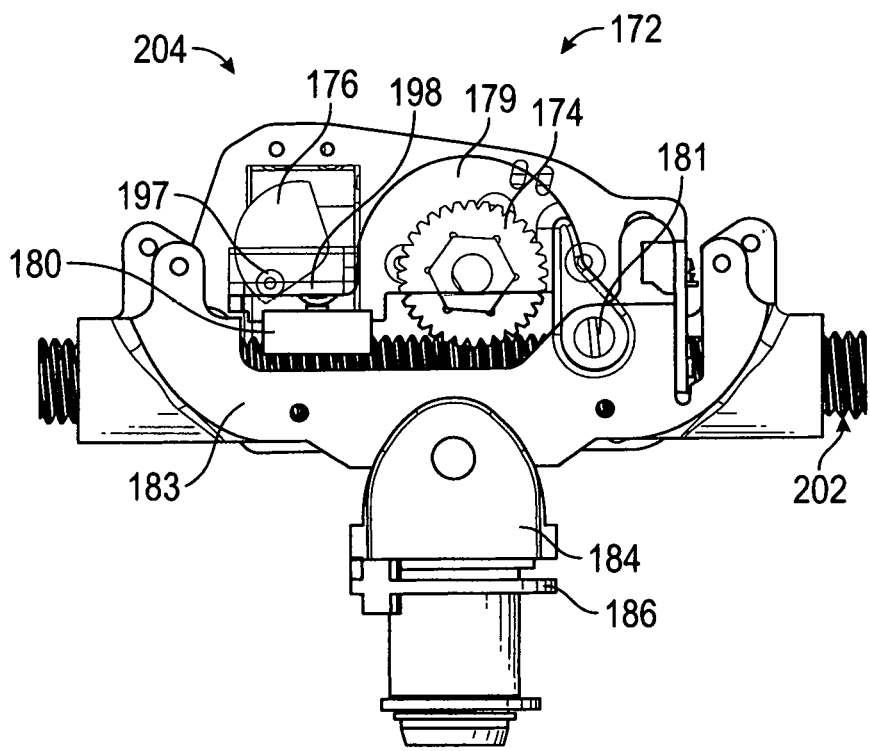
FIG. 17B is a partial cutaway perspective view of the shuttle of the golf swing training device of FIG. 1, wherein the lock rack is engaged with the club shaft.

The golf club (13) is preferably a cylindrical rod having threads (201) on at least a portion of an outer surface thereof as shown in FIGS. 17A, 17B, and 18. The golf club (13) includes a handle (203) and a shaft (202) simulating that of an actual golf club.

In a preferred embodiment, the threads (201) are sized at 5/16-18 UNC. However, other suitable thread sizes and thread profiles may be used instead.

The head subassembly (8) on the shuttle (12) simulates the visual appearance of a golf club's head arid supports the golf club (13) to move the shuttle (12) throughout all phases of the golfer's swing when using the device (1). The head subassembly (8) provides four unique degrees of freedom for the movement of the golf club as the shuttle moves around the ring (11) during the phases of the swing. Furthermore, the head subassembly (8) determines the golfer's handedness as being either left or right.

The head subassembly (8) comprises a club guide frame (183), a club head pivot clevis (184), a clevis pivot pin (185), a pivot stop ring (186) and a head subassembly wiring harness (188).

Degrees of Freedom

The four degrees of freedom allowed by the golf swing training device (1) are shown on FIG. 18 as being along and around an X-axis (102), around a Y-axis (103) and around a Z-axis (104) that are designated in alignment with the golf club (13) and the head subassembly (8). A first degree of freedom is axial movement of the golf club (13) in a longitudinal direction along the X-axis (102) that is in alignment with the shaft (202) of the golf club (13). A second degree of freedom is a rotational movement of the golf club (13) in a direction about the X-axis (102) which extends through the club's shaft (202). A third degree of freedom is a rotational movement of the golf club (13) about the Y-axis (103) which extends perpendicularly to the club's shaft (202) defined by the interface between the head subassembly (8) and the frame subassembly (7). The fourth degree of freedom is a rocking movement of the golf club (13) about the Z-axis (104) which extends perpendicularly to the X-axis (102) and Y-axis (103). These four degrees of freedom provided by the golf swing training device (1) enable a natural golf swing.

The movement of the golf club (13) enabled by the first degree of freedom accommodates the changing distance between the golfer's hands and the shuttle (12) as the shuttle (12) is moved around the ring (11) through the phases of the golf swing.

The movement of the golf club (13) enabled by the second degree of freedom allows for a rolling motion of the golfer's hands throughout the phases of his or her golf swing.

The club head pivot clevis (184) is pivotally mounted on the frame subassembly (7) and provides for the third degree of freedom allowing the golf club (13) mounted in the head subassembly (8) to rotate in a swiveling motion that corresponds to the breaking of the golfer's wrist throughout the phases of the golf swing. The pivot stop ring (186) limits the rotation of the club head pivot clevis (184) and hence the rotation of the head subassembly (8) on the frame subassembly (7). In a preferred embodiment, the rotation defined by the third degree of freedom allows up to a magnitude of 480 degrees of rotation as limited by the head subassembly wiring harness (188) extending between, the frame (7) and head (8) subassemblies.

The club head pivot clevis (184) also provides the rocking movement defined, by the fourth degree of freedom. This rocking movement, affords the golfer's hands the ability to move outside of the swing plane defined by the ring (11).

Club Shove Mechanism

Referring to FIGS. 8, 17A, 17B and 32, the head subassembly (8) includes a club shove mechanism (172) that increases the distance between the golfer's hands and the shuttle (12) at points that correspond to selected locations of the shuttle (12) on the ring (11) through a rack and pinion arrangement. The club shove mechanism (172) is coordinated by the microprocessor (148) on the motherboard assembly (127).

The club shove mechanism (172) is housed within the head subassembly (8) and includes a shove motor pinion (174), a club shove motor (173), and a shove encoder assembly (175) all of which are attached to a common shaft on the club shove mechanism (172). The shove motor pinion (174) is in constant engagement with the threads (201) on the golf club's shaft (202). When an appropriate signal is received from the microprocessor (148) the club shove motor (173) is activated and rotates the shove motor pinion (174). When the shove motor pinion (174) is rotated, the shaft (202) of the club (13) is forced to move axially in the club guide frame (183) of the head subassembly (8).

Preferably, a golfer's selected anthropometric data, including shoulder width, which is proportional to shove distance, is entered into the shuttle (12). The microprocessor (148) then calculates via an algorithm the proper amount of shove, or change in distance between the golfer's hands and the shuttle that is required through the golfer's backswing.

As the shuttle (12) progresses around the ring (11) during the backswing, the microprocessor (148) monitors the rotary encoder (125) and activates the club shove motor (173) when appropriate. At the same time, the microprocessor (148) is also monitoring the shove encoder assembly (175) to maintain coordination between the distance of the axial shove of the golf club (13) and the position of the shuttle (12) on the ring (11) during the backs-wing. As a result of shoving the club (13), the user's hands are moved into a proper position relative to the individual's torso during the final portion of the backswing. This final portion of the backswing occurs after the club (13) moves past the nine o'clock position and the club shove mechanism (172) is activated and continues upward to near the top of the backswing.

Club Lock Mechanism

The club lock mechanism fixes or locks the club (13) against axial motion within the head subassembly (8). The club (13) can be locked against axial motion during a specific portion of the golfer's swing, preferably between completion of the backswing and a portion of the downswing.

The club lock mechanism is housed in the head subassembly (8) and includes a club lock rack (180), a club lock servo (177), a club lock cam (176), and a club lock frame (179) as shown in FIGS. 17A, 17B and 32. The club lock servo (177) drives the club lock cam (176) and is actuated by the microprocessor (148) on the motherboard assembly (127).

When an appropriate signal is received from the microprocessor (148), the club lock servo (177) selectively secures and locks the club's shaft (202) against movement relative to the shuttle (12) by moving the club lock rack (180) into engagement with the club shaft (202).

In a preferred embodiment, an outer surface of the club shaft (202) has threads (201) and the club lock rack (180) has threads (196) that correspond to those threads (201) on the club's shaft (202). Alternatively, a smooth club shaft could be used in lieu of the threaded shaft.

The club lock rack (180) is attached to the club lock frame (179). The club lock cam (176) includes a cam pin (197) that is positioned to engage with a slot (198) in the club lock frame (179). The club lock cam (176) is mounted to the club lock servo (177). As the club lock servo (177) moves the club lock cam (176), the cam pin (197) moves along the slot (198). As the cam pin (197) moves along the slot (198), the club lock frame (179) pivots on the frame pivot pins (181) to alternately engage the club lock rack (180) with the club shaft (202) and disengage the club lock rack (180) from the club shaft (202).

When the club lock rack (180) is in engagement with the club's shaft (202), the club (13) is deterred from axial movement within the shuttle (12), as shown in FIG. 17B. When the club lock servo (177) receives a signal from the microprocessor (148) to disengage the club lock rack (180) from the club shaft (202), the club lock servo (177) moves the club lock rack (180) out of contact with the golf club's shaft (202), as shown in FIG. 17A, and the club (13) is allowed to move relative to the shuttle (12).

The club lock mechanism includes a locked configuration and an unlocked configuration. In the locked, configuration of FIG. 17B, the club lock rack (180) engages the club's shaft (202) and the club (13) is deterred from axially moving within the shuttle (12). In the unlocked configuration of FIG. 17A, the club lock rack (180) is disengaged from the club shaft (202) so that the shaft (202) is free to move within the shuttle (12).

During the golfer's swing, the microprocessor (148) senses the change in direction of the club (13) when transitioning from the backswing to the downswing, as determined by the top of backswing parameter set by the user at startup, and sends a signal to the club lock servo (177) that corresponds to when the club lock mechanism should be engaged to axially fix the club's shaft (202) on the shuttle (12). When the club lock servo (177) receives the signal from the microprocessor (148), the club lock servo (177) is actuated causing the cam pin (197) on the club lock cam (176) to rotate and drive the club lock frame (179), thereby forcing the club lock rack (180) into engagement with the threads (201) on the golf club (13). This locks the club (13) against axial movement within the shuttle (12) so that the distance between the shuttle (12) and the golfer's hands is fixed.

Consequently, the distance between the shuttle (12) and the golfer's hands can be fixed during a key portion of the golfer's swing. In this way, the head subassembly (8) can control and constrain the axial motion of the golf club (13) to reinforce the proper muscle memory of a professional-grade golf swing.

The club lock mechanism cooperates with the club shove mechanism to ensure that the user swings the club (13) through the proper swing plane and that the user's hands move in proper relationship with the corresponding twist of the torso during the swing. The cooperation of the club lock mechanism and the club shove mechanism acts to eliminate "throwing," "casting" or "pulling" of the club (13) during the swing.

The activations of the club lock mechanism and club shove mechanism are dependent on preselected variables based on the movement and position of the shuttle (12) on the ring's circumference.

Figure 10:
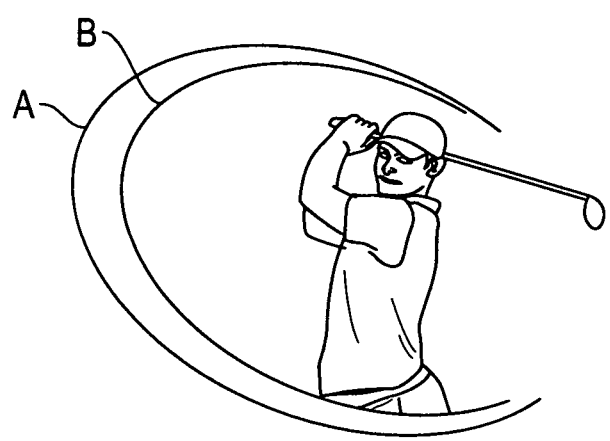
FIG. 10 is a perspective view of a golfer swinging a club with a depiction of the swing envelope showing the backswing and downswing paths taken by a club head during a preferred club swing.

An example of a swing envelope created during a proper backswing is shown schematically in FIG. 10. The backswing envelope (A) is larger than the downswing envelope (B). With the club (13) "shoved" and locked against radial movement in a segment of the downswing extending from the top of the backswing to the nine,o'clock position, the golfer's downswing is maintained as a smaller swing envelope (B) than that of the backswing envelope (A).

The magnitude of resistance imparted by the resistance mechanism is selectively variable and can be adjusted to suit the individual user. In one preferred embodiment., the magnitude of resistance ranges from zero to 10, wherein zero is "no resistance" and 10 is the "maximum resistance". The digital display (54) shown in FIG. 4 on the shuttle (12) displays the resistance parameters that are available for selection by a user. The resistance can be selected to be constant or intermittent as the shuttle (12) moves along the ring (11).

In addition, the modes of operation are displayed on the digital display (54) and can be selected separately to suit the particular user.

Preferably, four modes of operation are provided and include the following: (1) resistance provided through the entire swing; (2) resistance provided, through the backswing only; (3) resistance provided through the downswing only; and (4) resistance provided throughout the follow through only.

In a preferred embodiment, the digital display (54) comprises a liquid crystal display (LCD). Selection of desired operating parameters and modes of operation are preferably made using the selector keys (199) shown in FIG. 4.

As the shuttle (12) travels around the ring (11) the rotary encoder (125) tracks the shuttle's location on the ring (11), transmitting positional information to microprocessor (148). When it is determined that the shuttle (12) has reached a certain location on the ring (11), the microprocessor (148) in the shuttle (12) activates any preselected change in resistance.

Although specific examples of resistance and shove available to the user have been discussed, an extensive range of such parameters can be made available. The resistance to which the shuttle (12) is subjected can be constant, intermittent or eliminated entirely. The magnitude of the resistance supplied can be varied as desired by the user at any location along the circumference of the ring (11). Likewise, the club shove feature can be activated or eliminated and the amount of shove that is applied to the club (13) can be varied as desired, by the user. Also, the location on the ring (11) where the shove takes place can be varied as desired in instances where it is determined that additional benefits will result therefrom.

Operating parameters, as well as modes of operation, can be selected from the digital display (54) using the selector keys (199). Other types of means for selecting such items can be used instead, including wireless syncing applications. Preferably, Bluetooth technology is built into the shuttle (12) which allows for an application on a cell phone to be used to program and operate the device (1).

Means for Determining the Handedness of the Golfer

The golf swing training device (1) can determine the handedness of the golfer using the device (1). The direction that, a golf club (13) is inserted into the club guide frame (183) of the head subassembly (8) indicates if the golfer is swinging left handed or right handed. For example, the club (13) is inserted into the club guide frame (183) from one direction to set up the golf swing training device (1) to swing the club (13) from a right handed position and the club (13) is inserted into the club guide frame (183) from the opposite direction to set up the device (1) to swing from a left handed position.

The golf swing training device (1) comprises means for determining the handedness of the golfer that includes the shove encoder assembly (175) and an optical beam interrupter (182) as shown in FIG. 32 in the head subassembly (8). The microprocessor (148) on the motherboard assembly (127) constantly monitors and interprets signals from the shove encoder assembly (175) and the optical beam interrupter (182).

During insertion of the golf club (13) into the head subassembly (8), the order in which the microprocessor (148) receives the signals from the shove encoder assembly (175) and the optical beam interrupter (182) will indicate the direction of the club's insertion. The direction from which the club (13) is inserted determines the golfer's handedness. As shown in FIG. 32, a golf club (13) inserted into the head subassembly (8) from the right side would pass by the optical beam interrupter (182) before passing by the shove encoder assembly (175) as the club (13) slides into the club guide frame (183). Consequently, the microprocessor (148) would receive a signal from the optical beam interrupter (182) before receiving a signal from the shove encoder assembly (175), indicating that the direction of insertion of the club (13) was from right to left. With the club (13) so inserted, the head front housing (169) of the head subassembly (8) would be facing to the left for a right handed golfer.

Conversely, when the golf club (13) is inserted into the head subassembly (8) from the left side in FIG. 32, the club (13) passes by the shove encoder assembly (175) before passing by the optical beam interrupter (182). Similarly, the microprocessor (148) receives the signal from the shove encoder assembly (175) first, indicating that the direction of insertion of the club (13) was from left to right. Such an insertion would position the head front housing (169) of the head subassembly (8) facing to the right for a left handed golfer.

Means for Dissipating Static Electricity

The golf swing training device (1) further comprises means for dissipating static electricity. Static electricity may build up on the shuttle (12) as it moves around the ring (11). The means for dissipating static electricity is a static wicking brush (151) shown in FIG. 20 to be attached to the motor support frame (134). The static wicking brush (151) transfers any static electricity accumulation through the ring (11) to the ground. Preferably, the static wicking brush (151) comprises conductively-coated threads. However, other suitable components could be used instead.

Means for Releasably Securing the Shuttle to the Ring

The shuttle (12) is attached to the ring (11) when the device (1) is in use. The shuttle (12) can be detached from the ring (11) during transport or for storage of the golf swing training device (1) by means for releasably securing the shuttle (12) to the ring (11).

The means for releasably securing the shuttle to the ring is a shuttle attachment mechanism. Referring to FIGS. 15, 20, 25, 26 and 33, the shuttle attachment mechanism includes a shuttle frame (152), a shuttle latch (126), a pinch roller assembly (164) and a pair of tracking roller assemblies (200). The pinch roller assembly (164) is attached to the shuttle pivot chassis (123) and the tracking roller assemblies (200) are mounted on the shuttle frame (152).

The pinch roller assembly (164) includes a pinch roller frame (167) on which a pinch roller (166) is mounted, a pair of pinch roller disengagement linkages (168) extending between the pinch roller frame (167) and the shuttle pivot chassis (123), and a pinch roller assembly spring (165) extending between the pinch roller frame (167) and the shuttle frame (152).

Each of the tracking roller assemblies (200) comprises a tracking roller (163) rotatably mounted on a latch bracket (161) by a roller mount (159). Further comprising each tracking roller assembly (200) is a shuttle latch lock cam surface (190).

Figure 15:
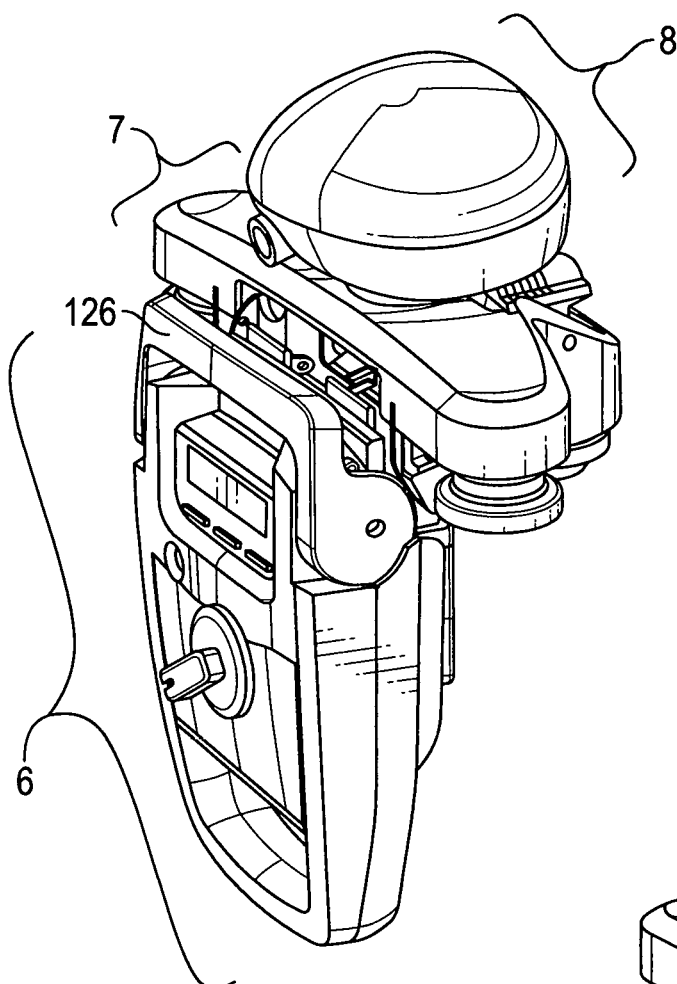
FIG. 15 is a perspective view of the shuttle of the golf swing training device of FIG. 1 shown in an active use position.

The shuttle latch (126) includes a pair of shuttle latch lock linkages (189) arid is pivotally mounted to the shuttle pivot chassis (123). As the shuttle latch (126) is moved into an upright position, the shuttle latch lock linkages (189) engage with the shuttle latch lock cam surfaces (190). When the shuttle latch (126) is in the fully upright position the shuttle (12) is secured onto the ring (11) as shown in FIG. 15.

As the shuttle latch (126) moves downwardly, the shuttle latch lock linkages (189) become disengaged from the shuttle latch lock cam surfaces (190) on each of the tracking roller assemblies (200). The pinch roller assembly spring (165) biases the housing subassembly (6) away from the shuttle pivot chassis (123) to facilitate disengagement of the shuttle latch lock linkages (189) and the shuttle latch lock cam surfaces (190). When the shuttle latch (126) is in the fully downward position as shown in FIG. 16, the shuttle latch lock linkages (189) are disengaged from the respective latch brackets (161) and the housing subassembly (6) on the shuttle (12) is allowed to pivot away from the ring (11).

The housing subassembly (6) is further biased into removal by rotation stops on the shuttle pivot chassis (123) and an over-center relationship between the pinch, roller frame (167), the center of rotation of the shuttle pivot chassis (123), and the attachment location of the pinch roller disengagement linkages (168) on the shuttle pivot chassis (123).

Figure 16:
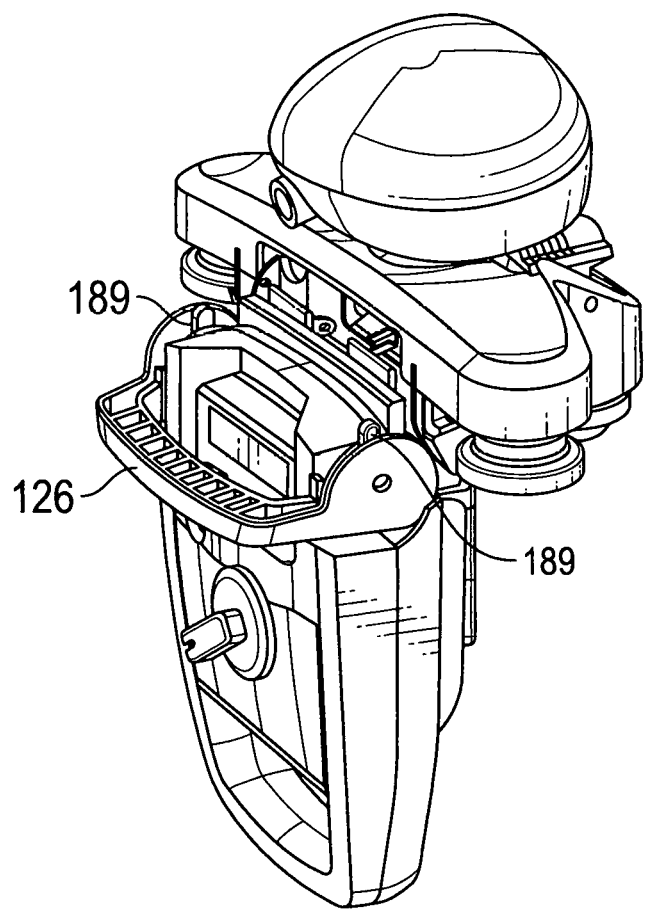
FIG. 16 is a perspective view of the shuttle of the golf swing training device of FIG. 1 shown in an unlatched position.

To disengage the shuttle (12) from the ring (11), the shuttle latch (126) is placed in the downward position shown in FIG. 16 and the shuttle housing subassembly (6) is rotated about the shuttle pivot chassis (123) relative to the shuttle frame subassembly (7). The two pinch roller disengagement linkages (168) are each pivotally attached at one end to the pinch roller frame (167) and pivotally attached at the other end to the shuttle pivot chassis (123) and coordinate rotation of the pinch roller frame (167).

As the shuttle housing subassembly (6) is rotated away from the ring (11), the two pinch roller disengagement linkages (168) are pulled, along with the shuttle pivot chassis (123). As a result, the pinch roller (166) is pulled away from contact with the ring (11) to thereby allow for complete removal of the shuttle (12) from the ring (11).

To attach the shuttle (12) to the ring (11) for use, the aforementioned functions are caused to occur in reverse, concluding with the shuttle latch (126) being placed in the upright position shown in FIG. 15.

The club lock mechanism and the club shove mechanism (172) cooperate to maintain the club (13) in the proper position throughout the swing. The combination of the club shove mechanism (172) moving the club (13) axially inwardly during portions of the backswing and the club lock mechanism detering axial movement of the club (13) during the downswing, advances the hands of the user through the downswing with a corresponding appropriate rotation of the body. Club head, speed, is improved by this coordination of the user's hands with the twist of his or her torso during the swing.

The golf swing training device (1) of the present invention is set up for use by adjusting the device (1) for a particular user's size and needs.

The adjustable support frame (15) can be sized to fit the size of an individual user by adjusting the height of the ring (11) and by adjusting the angle of the swing plane of the ring (11). Preferably, the support frame (15) is first adjusted for height in order to set the ring (11) at the proper height for the particular user. Next, the support frame (15) is adjusted in order to set the ring (11) at the proper angle for the swing plane of the individual user.

To adjust the height of the ring (11), the sliding base plate (32) of the sliding adjuster assembly (23) is released by pressing downwardly on the actuator (34).

When released, the sliding base plate (32) is free to slide forward and back on the platform (14) and is moved to the desired position in order to set the appropriate height of the ring (11) for the individual user. As the sliding base plate (32) moves forward toward the front of the platform (14), the height of the ring (11) is increased. Conversely, the height of the ring (11) decreases when the sliding base plate (32) moves in a direction toward the back of the platform (14). When the ring (11) is in the desired position, the actuator (34) is released thereby engaging the plate lock (33) to hold the ring (11) at the selected height. The ring (11) can be set at a known height by using the adjustment indicia (35) on the sliding adjuster assembly (23).

Next, to set the ring (11) at the proper angle for the user, the rod locks (37) of the telescoping rods (36) of the backstays (56) are released, allowing the telescoping rods (36) to slide freely relative to each other. With the telescoping rods (36) free to slide, the ring (11) is moved to the desired angle by lengthening or shortening the telescoping rods (36) of the backstays (56). The greater the lengths of the telescoping rods (36) are, the steeper the angle of the swing plane, formed by the ring (11) becomes. Conversely, the shorter the lengths of the telescoping rods (36) are, the flatter the angle of the swing plane becomes. When the ring (11) is adjusted to the proper angle, each of the rod locks (37) is then engaged, thereby locking the telescoping rods (36) in the selected position and maintaining the ring (11) at the desired swing plane angle.

Figure 19A:
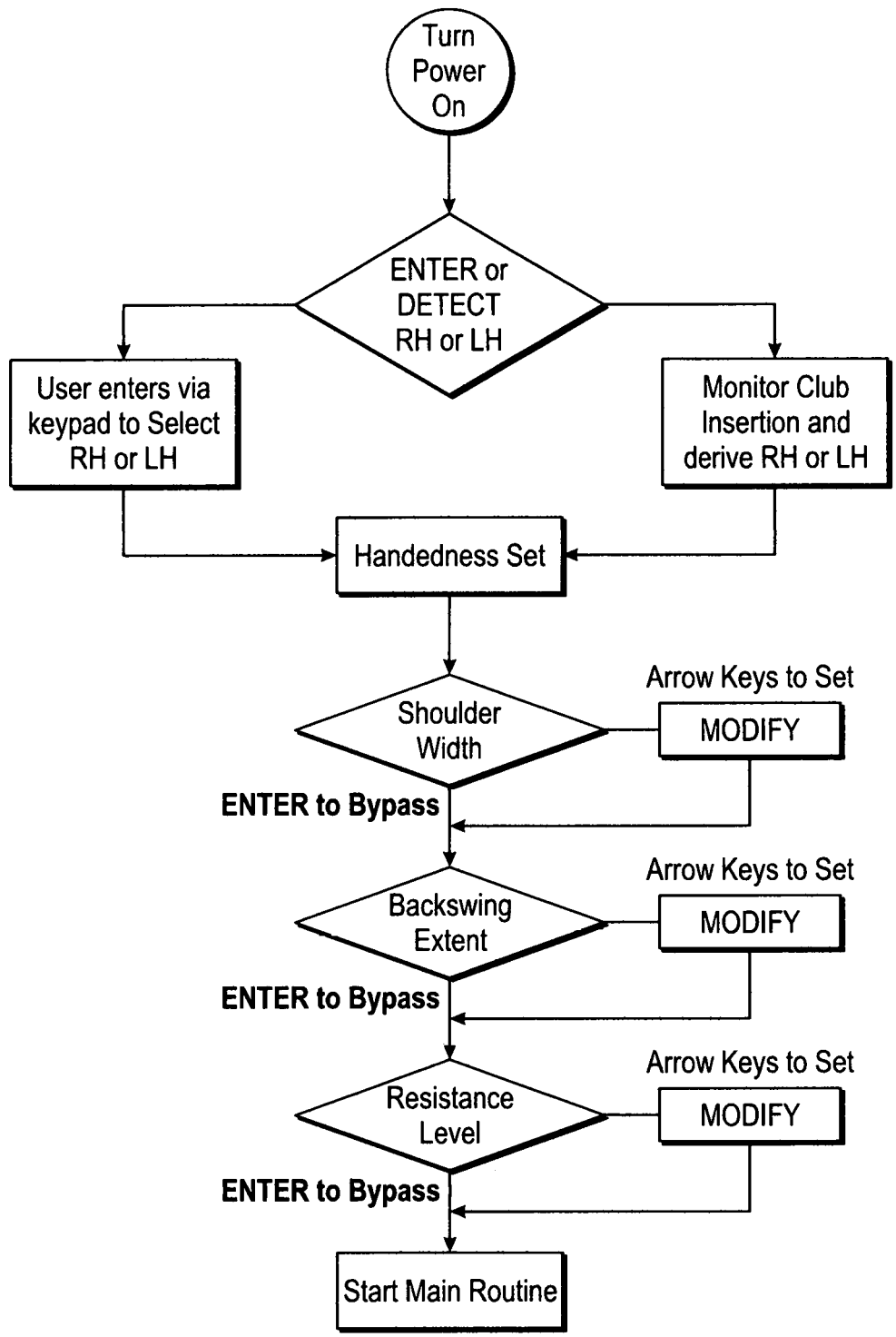
FIG. 19A is a flowchart showing a series of steps to set up the shuttle of the golf swing training device of FIG. 1 for use.

The steps for setting up the shuttle (12) for use by an individual user are set forth in the flowchart of FIG. 19A.

First power for the shuttle (12) is turned on. Next, the "handedness" of the user is entered by the user or determined by the device (1) when the club (13) is inserted, into the head subassembly (8) from either the right or left side. Anthropometric data of the user, including the width of the user's shoulders is entered into the shuttle (12) via the selector keys (199) on the housing subassembly (6). Using the anthropometric data, the proper amount of "shove distance" is calculated by the microprocessor (148) using an algorithm provided for the club shove mechanism (172). The calculated "shove distance" is the change in distance between, the user's hands and the shuttle (12) through the golfer's backswing and is used as a parameter for positional control during the backswing. Next, the extent of the user's backswing is selected and entered. A resistance level is then selected. However, it is noted that entry of shoulder width, backswing extent or resistance may be bypassed, if desired.

Figure 19B:
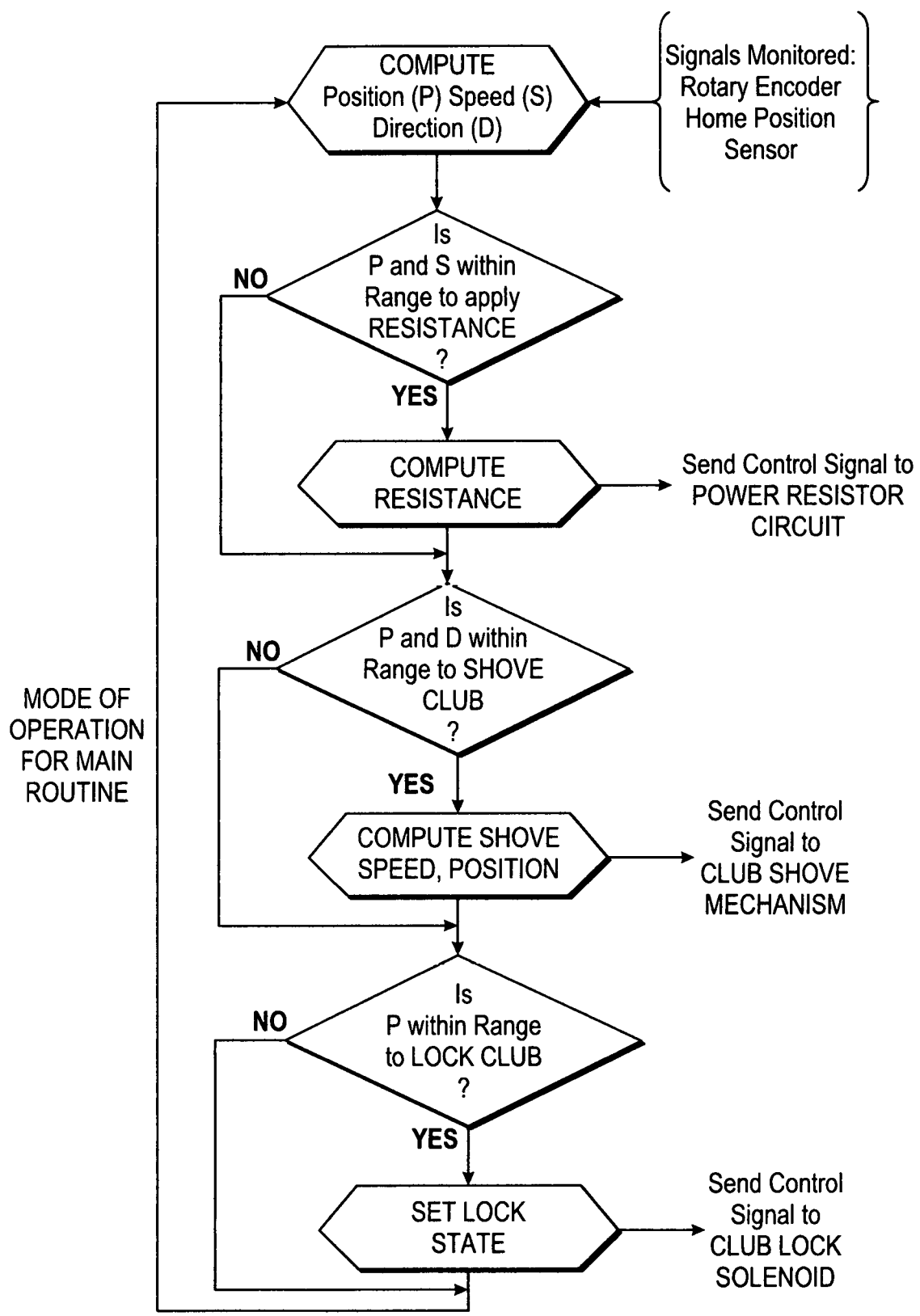
FIG. 19B is a flowchart, of a main routine for one preferred mode of operation for the golf swing training device of FIG. 1.

After the aforementioned selections have been made, the main routine of the shuttle (12) as set forth in the flowchart shown in FIG. 19B is ready to start.

To begin training with the device (1), the user steps onto the support area (18) of the platform (14), and grasps the handle (203) of the club (13). As a right handed golfer, the user assumes an address position with the club shaft (202) held at the six o'clock position sis shown in FIG. 1. From this six o'clock position the user begins his or her backswing by swinging the club shaft (202) away from the six o'clock position in a clockwise direction and towards the nine o'clock position on the ring (11) as viewed from the front of the device (1) facing the user. When the shuttle (12) reaches the nine o'clock position on the ring (11), the microprocessor (148), which is constantly monitoring location of the shuttle (12) on the ring (11), prompts the club lock servo (177) to activate the club lock mechanism to engage the club (13) in the locked configuration. This secures the club's shaft (202) against axial movement on the shuttle (12).

With the golf swing training device (1) in the locked configuration, the user continues his or her backswing as the shuttle (12) moves past the nine o'clock position on the ring (11) and the club shaft (202) remains locked against axial movement on the shuttle (12) by the club lock mechanism. As the shuttle (12) and club (13) continue to move together around the ring (11) in the backswing, the microprocessor (148) signals the club shove mechanism (172) to activate. The "shove" or "push" algorithm calculates the correct amount of shove/push to be applied to the club shaft (202). The shove motor pinion (174) is prompted to rotate and by doing so "pushes" or "shoves" the club's shaft (202) as directed so that the club (13) moves axially in a direction toward the user. The "shove" is applied to the club shaft (202) until near the top of the backswing. The club lock mechanism remains in the locked configuration as the club (13) and shuttle (12) continue to the top of the backswing.

At the top of the backswing, the club lock mechanism is still engaged with the club's shaft (202), thereby deterring any movement of the club (13) in an axial direction. This eliminates any "throwing or pulling" of the club (13), which would otherwise prevent the club (13) from moving through the correct swing path.

The downswing begins at the top of the backswing when the user reverses the direction of his or her swing. The downswing continues until the shuttle (12) is returned to the six o'clock position on the ring (11). In the initial stage of the downswing, the golf swing training device (1) remains in the locked configuration. The "shove" that took place during the backswing coupled with the locked configuration of the club shaft (202), guides the user's torso during the downswing to rotate ahead of the position of the user's hands.

The club shaft (202) is in the locked configuration as the shuttle (12) is moved forward along the ring (11) in the downswing. When the shuttle (12) reaches the nine o+clock position in the downswing, the rotary encoder (125) notifies the microprocessor (148) of the shuttle's location. The microprocessor (148) then actuates the club lock mechanism to release the club (13) so that the golf swing training device (1) is thereby in the unlocked configuration. With the training device (1) in the unlocked configuration, the club's shaft (202) is free to move axially and slide longitudinally on the shuttle (12). When the downswing reaches the six o'clock position, an indication of an imaginary ball being struck may be provided by the shuttle (12). As the swing continues with the shuttle (12) and club (13) moving past the six o'clock position, the swing transitions into the follow through. Throughout the swing, the user is guided to maintain the proper swing form.

The locking of the club's shaft (202) against axial movement through the initial stage of the downswing coupled with the "shove" that takes place during the backswing, constrains the golfer's body to rotate in an advanced phase relative to the position of his or her hands. Sometimes referred to as golf's "magic move", the user's torso correctly moves in a rotational manner just ahead of the movement of his or her hands during the swing. By rotating the torso ahead of the hands during the downswing, a golfer can also improve the club head speed of his or her swing.

With the golf swing training device (1) of the present invention, the correct swing plane is coordinated with the correct positioning of the arms in relation to the twist of the body during the swing, thereby improving the golfer's accuracy. The resistance mechanism develops the strength of the golfer, while simultaneously developing club head speed and accuracy.

By repeatedly using the golf swing training device (1), a golfer can build muscle memory for a proper swing. Repeated practice will also increase the user's swing strength, power and accuracy. Having developed, the muscle memory for a proper swing, the user will be able to execute a correct swing without the assistance of the golf swing training device (1).

Although the present invention has been described in considerable detail with reference to certain preferred versions thereof, other versions are possible. Therefore, the spirit and scope of the appended claims should not be limited to the description of the preferred versions contained herein.

The invention claimed is:

1. A shuttle for holding a club on a golf swing training device to guide a user through a proper golf swing, wherein the club has a shaft and the golf swing training device includes a ring, the shuttle comprising:
    a housing subassembly;
    a frame subassembly;
    a head subassembly;
    a microprocessor; and
    a motherboard assembly supporting said microprocessor;
    a club shove mechanism, wherein said club shove mechanism moves the club to thereby change the distance between the user's hands and the shuttle;
    said head subassembly further comprises a club guide frame;
    wherein said club guide frame supports a club therein;
    said club shove mechanism comprises a club shove motor, a shove motor pinion, and a shove encoder assembly; wherein said shove motor pinion is driven by said club shove motor; and said shove motor pinion engages the shaft of the club supported in the club guide frame;
    said shuttle further comprises a rotary encoder for tracking the location of the shuttle on the ring and transmitting the location to the microprocessor; wherein said microprocessor monitors the rotary encoder to determine the position of the shuttle at any location on the ring during any phase of a golfer's swing.

2. The shuttle of claim 1, wherein said microprocessor calculates a magnitude of applied shove imparted by said club shove mechanism to said club based on user data entered into the shuttle; and
    wherein a signal from said microprocessor activates the club shove motor to rotate the shove motor pinion, that in turn moves the club's shaft in a direction along a longitudinal axis of the supported club on the head subassembly.

3. The shuttle of claim 2, wherein said head subassembly further comprises a club head pivot clevis and a clevis pivot pin, wherein a portion of said club head pivot clevis is rotationally mounted on said frame subassembly.

4. The shuttle of claim 3, wherein said head subassembly further comprises a pivot stop ring, wherein said pivot stop ring limits rotational movement of said club head pivot clevis and said head subassembly relative to the frame subassembly.

5. The shuttle of claim 3, wherein said shuttle allows four degrees of freedom for movement of the club on said head subassembly which includes rotation around an X-axis, rotation around a Y-axis, rocking about a Z-axis, and longitudinal movement along the X-axis;
    wherein the X-axis is aligned with the longitudinal axis of the shaft of the club supported in the club guide frame; the Y-axis extends perpendicularly to said X-axis and through said frame, housing and head subassemblies; and the Z-axis extends perpendicularly to the X-axis and the Y-axis;
    said four degrees of freedom comprise first, second, third and fourth degrees of freedom; wherein the first degree of freedom comprises longitudinal movement of said shaft along the length of said X-axis; the second degree of freedom comprises rotational movement of the shaft about said X-axis; the third degree of freedom comprises rotational movement of the club's shaft about said Y-axis; and the fourth degree of freedom comprises a rocking movement of the shaft about said Z-axis.

6. The shuttle of claim 5, wherein movement of the club enabled by the first degree of freedom allows for a distance increase between the user's hands and the shuttle as the shuttle moves around the ring;

wherein movement of the club enabled by said second degree of freedom allows for a rolling motion of the user's hands throughout the swing;

wherein movement of the club enabled by said the third degree of freedom allows a supported club to rotate about the Y-axis which corresponds to the breaking of a user's wrist through the golf swing;

wherein movement of said club head pivot clevis enabled by the fourth degree of freedom allows a supported club to rock about said Z-axis, and thereby allows a user's hands to move outside of a swing plane defined by the angle of the ring during a user's swing.

7. The shuttle of claim 4, wherein as the shuttle progresses around the ring during a user's swing, the microprocessor monitors the rotary encoder to determine the location of the shuttle on the ring in order to activate the club shove motor at determined locations; wherein said shove encoder assembly is monitored by said microprocessor to coordinate between a distance of the club's axial shove and the shuttle's position on the ring during the swing.

8. The shuttle of claim 1, said shuttle further comprising a club lock mechanism; wherein said club lock mechanism is disposed within said head subassembly, and secures the club against axial motion within the head subassembly; and
wherein said club lock mechanism includes a locked configuration and an unlocked configuration.

9. The shuttle of claim 8, wherein said club lock mechanism comprises a club lock rack; wherein said club lock'rack locks the club against axial movement on the head subassembly.

10. The shuttle of claim 9, wherein said club lock rack comprises threads;
the club comprises threads disposed on the shaft; wherein said threads on said club lock rack engage the threads on said shaft to lock the club against axial movement.

11. The shuttle of claim 9, wherein said club lock mechanism further comprises a club lock servo, a club lock cam, a club lock frame, and a cam pin;
said club lock frame comprises a slot therein;
wherein said club lock frame is pivotally mounted in said head subassembly; said club lock rack is mounted on the club lock frame; said cam pin is mounted on said club lock cam; and said cam pin is moveably mounted in said slot on said club lock frame; and
wherein when said club lock mechanism is activated, said club lock servo pivots the club lock cam which moves the cam pin along the slot; as the cam pin moves along the slot in a one direction, the club lock frame is pivoted within said head subassembly, thereby moving the club lock rack into engagement with the club's shaft and into the locked configuration; and as the cam pin moves along the slot in an opposite direction, the club lock frame is pivoted on the frame pivot pins; thereby moving the club lock rack out of engagement with the club's shaft and into the unlocked configuration.

12. The shuttle of claim 11, wherein the shaft of the club includes threads on an outer surface thereof; wherein in said locked configuration, the threads on the club lock rack engage the threads on the club.

13. The shuttle of claim 11, wherein said housing subassembly includes a digital display and selector keys, wherein a user enters selected data into the shuttle via said selector keys;
wherein preselected variables based on movement and position of the shuttle on said ring are calculated by the microprocessor using parameters entered into said digital display via said selector keys for each user; the microprocessor generates a signal based on the calculations; the signal is sent from the microprocessor to the club lock servo to activate said club lock mechanism, and thereby move the club lock mechanism between said locked and unlocked configurations.

14. A golf swing training device to guide a user through a proper golf swing, the golf swing training device comprising:
a support base;
a ring adjustably mounted on the support base;
a shuttle for holding a club, wherein said shuttle is moveably mounted on the ring;
a microprocessor;
a motherboard assembly supporting said microprocessor; and
a rotary encoder, wherein said rotary encoder analyzes position, speed and direction of the shuttle on the ring;
said rotary encoder having an encoder roller, an encoder frame, an encoder wheel, an encoder shaft, and an encoder sensor printed circuit board;
said encoder wheel including magnetic poles;
wherein said encoder roller and said encoder wheel are adjoined by said encoder shaft and are rotatably supported by said encoder frame; and said encoder roller is in contact with said ring during use.

15. The golf swing training device of claim 14, wherein said rotary encoder includes a first Hall effect sensor disposed on said encoder frame; and
wherein to determine the position of the shuttle on the ring, the encoder roller rotates along with the encoder wheel as the shuttle moves around the ring; the magnetic poles alternate on the rotating encoder wheel and prompt the first Hall effect sensor to send a signal to the microprocessor;
wherein each pulse corresponds to the distance that the shuttle and encoder roller have moved along the ring in relation to a ratio of the encoder wheel's circumference to the encoder roller's circumference.

16. The golf swing training device of claim 14, wherein said rotary encoder includes a compression spring; and
wherein said compression spring of said rotary encoder biases said encoder frame toward said ring so that said encoder roller maintains contact with said ring when said shuttle is installed.

17. The golf swing training device of claim 15, wherein to calculate speed of the shuttle moving around the ring, the microprocessor calculates the time between pulses from the encoder sensor printed circuit board; and the microprocessor determines a rate of rotation of the encoder wheel which indicates the speed of the shuttle moving on the ring.

18. The golf swing training device of claim 17, wherein to determine direction of movement of the shuttle on the ring, said first Hall effect sensor of the rotary encoder is arranged in quadrature and sends pulse sequences to the microprocessor by way of the encoder sensor printed circuit board; said microprocessor determines the rotational direction of the encoder roller, and the rotational direction of the encoder roller indicates the direction of the shuttle's movement on the ring.

19. The golf swing training device of claim 18, wherein said rotary encoder comprises at least one precision bearing rotatably supporting the encoder shaft within said encoder frame.

20. The golf swing training device of claim 16, further comprising means for recalibrating the microprocessor.

21. The golf swing training device of claim 20, wherein said means for recalibrating the microprocessor comprises a second Hall effect sensor and a recalibration magnet, wherein said second Hall effect sensor is mounted on the encoder frame, and said recalibration magnet is fixedly mounted on the ring.

22. The golf swing training device of claim 21, wherein to recalibrate the microprocessor, as the shuttle moves around the ring and passes the recalibration magnet, the second Hall effect sensor is then activated; the microprocessor is prompted to compare the positions of the recalibration magnet on the ring with respect to the microprocessor's position on the shuttle; and the microprocessor then recalibrates to correct any accumulated error in the microprocessor's position.

23. A golf swing training device to guide a user through a proper golf swing, the golf swing training device comprising:
   a support base;
   a ring adjustably mounted on the support base;
   a shuttle moveably mounted on the ring and adapted to support a club; and
   said support base comprises a platform and an adjustable support frame;
   said adjustable support frame comprises an adjustable ring prop; wherein said ring prop supports the ring at various angular positions on said platform;
   said ring prop includes a sliding adjuster assembly having a sliding base plate slideably mounted on said platform;
   said ring prop includes a clevis and a yoke; wherein said clevis is pivotally attached at one end to said platform and pivotally attached at an opposite end to said yoke; and said yoke is pivotally attached at one end to said sliding base plate and pivotally attached at an opposite end to said ring;
   wherein said sliding base plate is movable into various selectable positions on said platform to adjust the position of said ring prop, and thereby adjust the angular position of said ring on the platform.

24. The golf swing training device of claim 23, wherein said adjustable support frame further comprises an adjustable backstay for supporting said ring at various adjustable heights.

25. The golf swing training device of claim 24, wherein said backstay includes a pair of telescoping rods, a pair of rod locks, and a pair of upper rod pivotal joints, wherein each of said rod locks secures a respective telescoping rod at a selected length, and each of said telescoping rods pivotally attached to said ring by a respective upper rod pivotal joint and each of said telescoping rods attached at an opposite end to said adjustable support frame.

26. The golf swing training device of claim 23, wherein said sliding adjuster assembly further comprises a plate lock for releasably securing said sliding base plate on said platform.

27. The golf swing training device of claim 26, wherein said plate lock comprises an actuator for releasing and engaging said plate lock.

28. The golf swing training device of claim 27, wherein said plate lock further comprises first and second support blocks, a lock bar, a pair of tension wires, a pair of compression springs, and a pair of clamp lock links; wherein said first and second support blocks are mounted on said platform; said lock bar is slideably mounted on said first and second support blocks; said tension wires are attached to the first block and said clamp lock links; and said sliding base plate is mounted on said lock bar and is slideable therewith;
   said actuator comprises a pair of ribs; wherein said actuator is pivotally attached to said second support block and pivots into engagement with said first support block when depressed against a force of said compression springs to secure said ring prop and said ring in position; said actuator pivots out of engagement with said first support block by the force of said compression springs when said actuator is released to release said ring prop and said ring for movement.

29. The golf swing training device of claim 28, wherein to adjust the ring to a selected height and angular position, the telescoping rods of the backstay are released; and the actuator is depressed into engagement with said first support block whereby each of said ribs press on a respective tension wire which releases the clamp lock links from locking engagement with said lock bar allowing said lock bar and said sliding base plate to slide on said platform; and the ring is moved into a selected position;
   wherein to lock the ring in the selected position, the actuator is released and the compression springs force the actuator away from the first support block, thereby disengaging said ribs from said tension wires and releasing said clamp lock links to engage the lock bar, thereby securing the lock bar and the sliding base plate against sliding movement on the platform and securing said ring prop and said ring in position.

30. A golf swing training device to guide a user through a proper golf swing, the golf swing training device comprising:
   a support base;
   a ring supported on said support base;
   a shuttle moveably mounted on said ring and adapted to support a club; and
   a shuttle resistance mechanism; wherein said shuttle resistance mechanism applies a variable resistance to movement of the shuttle along the ring;
   said shuttle resistance mechanism comprises a resistance roller, a resistance motor having a motor rotor, a motor support frame, and a resistance engagement linkage;
   wherein said resistance motor is mounted on said motor support frame, said resistance roller is mounted on said motor rotor of the resistance motor, and said motor support frame is mounted on said shuttle by said resistance engagement linkage.

31. The golf swing training device of claim 30 wherein said resistance roller is alternately engaged with said ring and disengaged from said ring.

32. The golf swing training device of claim 31 comprising a microprocessor and a motherboard assembly supporting the microprocessor; wherein the microprocessor is in communication with said shuttle resistance mechanism.

33. The golf swing training device of claim 32, wherein said motherboard assembly includes a field-effect transistor bridge and a heat sink, wherein as said shuttle moves around the ring with the resistance roller engaged with said ring, the resistance roller rotates the resistance motor rotor and creates a resisting force in opposition to the shuttle's motion; said resisting force produces an electrical current in the resistance motor which is shunted through the field-effect transistor bridge and converted to thermal heat; and said thermal heat is dissipated through the heat sink on said motherboard.

34. The golf swing training device of claim 33 wherein said microprocessor sends a pulse width modulated signal to the field-effect transistor bridge to control an amount of the generated electrical current shunted and to thereby vary the resistance imparted to the shuttle moving on the ring.

35. The golf swing training device of claim 34, wherein said shuttle further comprises a digital display and selector keys; wherein said selector keys enable a user to enter resistance parameters into the shuttle, and said digital display exhibits modes of operation of the shuttle.

36. The golf swing training device of claim 35, wherein said resisting force imparted to the shuttle can be varied throughout the phases of a user's swing.

37. The golf swing training device of claim 32, wherein said resistance engagement linkage comprises a cam plate, an engagement knob, a resistance sensor magnet, a stabilizer block, and a resistance biasing spring;
    said shuttle further comprises a housing subassembly having a shuttle pivot chassis;
    wherein said resistance engagement linkage is attached to the motor support frame; said motor support frame is pivotally attached to the shuttle pivot chassis in the housing subassembly and extends through the stabilizer block to the cam plate; and said cam plate includes a cam path;
    wherein the resistance engagement linkage is positioned to ride along the cam path; the cam plate is attached to the engagement knob and rotationally locked thereto; said resistance sensor magnet is disposed on the engagement knob; the resistance biasing spring biases the resistance roller toward the ring; and the resistance biasing spring is disposed between the shuttle pivot chassis and the motor support frame.

38. The golf swing training device of claim 37, wherein said shuttle further comprises a digital display assembly and a resistance Hall effect sensor on said display assembly;
    wherein when the engagement knob is rotated, the resistance sensor magnet passes over the resistance Hall effect sensor signaling to the microprocessor the position of the engagement knob; wherein the engagement knob includes a position for engaging the resistance roller with the ring and another position for disengaging the resistance roller from the ring.

39. The golf swing training device of claim 38, wherein when the engagement knob is rotated to one position, the cam plate rotates therewith; as the cam plate rotates, the resistance engagement linkage rides along the cam path, and the resistance engagement linkage pushes the motor support frame away from the shuttle pivot chassis thereby engaging the resistance roller with the ring; and when the engagement knob is rotated to another position, the resistance engagement linkage pulls the motor support frame toward the shuttle pivot chassis, thereby disengaging the resistance roller from the ring.

40. The golf swing training device of claim 38, wherein when the engagement knob is positioned to correspond to engagement of the resistance roller with the ring, the resistance biasing spring maintains the contact between the resistance roller and the ring, thereby deterring the resistance engagement linkage from separating away from the cam path on the cam plate; and
    wherein when the engagement knob's position corresponds with the engagement of the resistance roller with the ring, the force required by the golfer to move the shuttle around the ring is influenced by the inertia of the resistance motor when spinning; and
    wherein when the position of the engagement knob corresponds with a disengagement of the resistance roller from the ring, the force required to move the shuttle around the ring is lessened.

41. The golf swing training device of claim 40, wherein when the resistance roller is disposed against the ring and the shuttle moved to a preselected location on the ring, the microprocessor signals the shuttle resistance mechanism to apply a desired resistance to the movement of the shuttle via the resistance roller.

42. The golf swing training device of claim 30, wherein the amount of resistance applied by the shuttle resistance mechanism to the shuttle and club can be constant or varied throughout the swing.

43. A shuttle for securing a golf club to a golf swing training device, wherein the handedness of the user can be detected, said shuttle comprising:
    a head subassembly;
    a housing subassembly;
    a motherboard assembly;
    a microprocessor;
    means for determining the handedness of the user comprising an optical beam interrupter and a shove encoder assembly; and;
    a club removably supported on said head subassembly;
    said club comprises a shaft and a handle disposed on one end of said shaft;
    said head subassembly further comprises a club guide frame that receives the club therein;
    wherein said optical beam interrupter interacts with said shove encoder assembly; and said optical beam interrupter and said shove encoder assembly send signals to said microprocessor as said club is inserted into said head subassembly; and
    said optical beam interrupter is mounted on one end of said club guide frame and said shove encoder assembly is mounted proximate said club guide frame; whereby the club can be inserted into said club guide frame from a right-handed direction and from an opposite, left-handed direction.

44. The shuttle of claim 43, wherein the shove encoder assembly and the optical beam interrupter each send a signal to the microprocessor as the club passes by each of said optical beam interrupter and said shove encoder assembly as the club is inserted into the club guide frame of the head subassembly.

45. The shuttle of claim 44, wherein the order in which the microprocessor receives the signals from said optical beam interrupter and said shove encoder assembly determines the handedness of the user.

46. The shuttle of claim 45, wherein when said club is inserted into said club guide frame from left to right, said shove encoder assembly first detects said club passing and sends a signal to the microprocessor, then as the club moves through the head subassembly and passes the optical beam interrupter, then said optical beam interrupter sends a signal to the microprocessor which determines that the head subassembly is set up for a left-handed user; and
    wherein when said club is inserted into said club guide frame from right to left, said optical beam interrupter first detects said club passing and sends a signal to the microprocessor, as the club moves through the head assembly and passes the shove encoder assembly, then said shove encoder assembly sends a signal to the microprocessor which determines that the head subassembly is set up for a right-handed user.

47. The shuttle of claim 43, wherein said microprocessor is mounted on the motherboard assembly that is mounted in said housing subassembly.

48. A golf swing training device to guide a user through a proper golf swing, the golf swing training device comprising:
    a support base;
    a ring adjustably mounted on the support base;

a shuttle moveably mounted on the ring;
said shuttle comprises a housing subassembly, a frame subassembly and a head subassembly; and
a shuttle attachment mechanism for releasably securing the shuttle to the ring;
said shuttle attachment mechanism comprises a pair of tracking rollers, a pinch roller, a shuttle frame, a pair of tracking roller assemblies, a pinch roller assembly, and a shuttle latch; wherein said rollers ride along the ring when the shuttle is mounted on said ring;
said pinch roller assembly comprises a pair of pinch roller disengagement linkages;
said housing subassembly comprises a shuttle pivot chassis;
said shuttle latch comprises a pair of shuttle latch lock linkages and is pivotally mounted on said shuttle pivot chassis; and
wherein each of said tracking rollers is mounted on a respective one of said tracking roller assemblies by at least one precision bearing; and said tracking roller assemblies are mounted on said housing subassembly;
wherein said pinch roller is mounted on said pinch roller assembly by a precision bearing; and said pinch roller assembly is pivotally mounted on said shuttle frame;
each of said tracking roller assemblies comprises a latch bracket having a shuttle latch lock cam surface, and a roller mount extending from said latch bracket and supporting said tracking roller; and
wherein a relationship between the pinch roller assembly, the center of rotation of the shuttle pivot chassis, and the attachment location of the pinch roller disengagement linkages on the shuttle pivot chassis biases said shuttle into engagement with said ring; and wherein each of said shuttle latch lock linkages engages a respective one of said latch lock cam surfaces when the shuttle is secured on the ring.

49. The golf swing training device of claim 48, wherein said shuttle latch comprises a fully downward position wherein the shuttle is released from the ring and a fully upright position wherein the shuttle is moveably secured on the ring.

50. The golf swing training device of claim 48, wherein said pinch roller assembly further comprises a pinch roller assembly spring, wherein said pinch roller assembly spring is mounted between said pinch roller assembly and said shuttle frame to bias the pinch roller toward the ring.

51. A golf swing training device to guide a user through a proper golf swing, the golf swing training device comprising:
a support base;
a ring adjustably mounted on the support base;
a shuttle moveably mounted on the ring;
a rotary encoder;
a shuttle resistance mechanism;
means for determining the handedness of the golfer;
a static wicking brush for dissipating static electricity;
a club moveably supported on said shuttle;
a motherboard assembly; and
a microprocessor mounted on said motherboard assembly;
a rotary encoder;
a club shove mechanism; and
a club lock mechanism;
said club comprises a shaft, a handle disposed on one end of said shaft, and threads disposed along said shaft;
said ring comprises a cross section having a main body, a flange, a protrusion, and a pair of troughs; wherein said flange and said protrusion are disposed on said main body and extend circumferentially around the ring; said flange is disposed opposite to said protrusion such that said flange extends in a direction toward a center of the ring and said protrusion extends in a direction away from a center of the ring; and said troughs extend circumferentially around the ring and are disposed on opposing sides of said protrusion;
said support base comprises a platform and an adjustable support frame;
said platform includes a turf cover and a support area for supporting a user;
said adjustable support frame includes a stabilizing arc, an adjustable ring prop, and a backstay;
said ring prop includes a clevis, a yoke, and a sliding adjuster assembly; wherein said ring prop is attached to said ring and said platform, and said ring prop supports the ring at various positions on said platform;
said sliding adjuster assembly comprises a sliding base plate, a plate lock, and adjustment indicia; wherein said sliding base plate is releasably mounted on said platform to slide into various selectable positions on said platform, thereby adjusting the angular orientation of said ring on the platform; and said plate lock releasably locks said siding base plate against movement on said platform;
said clevis comprises a pair of legs and a pair of upper and lower leg pivot joints; wherein each of said legs is pivotally attached at one end to said platform by a respective lower leg pivot joint and is pivotally attached at an opposite end to said yoke by a respective upper leg pivot joint;
said yoke is Y-shaped and includes a pair of upper yoke pivot joints and a lower yoke pivot joint; wherein each upper end of said yoke is pivotally attached to said ring by a respective one of said upper yoke pivot joints and an opposite end of said yoke is pivotally attached to said sliding base plate of the sliding adjuster assembly by said lower yoke pivot joint;
said backstay comprises a pair of telescoping rods, wherein each of said telescoping rods includes a respective rod lock for releasably securing the telescoping rod at various selected lengths to selectively adjust a height of said backstay and said ring;
said backstay further comprises a pair of upper rod pivotal joints and a pair of lower rod connectors, wherein an upper end of each of the telescoping rods is pivotally attached to the ring by a respective upper pivotal joint, a lower end of each of the telescoping rods is attached to the stabilizing arc of the adjustable support frame by a respective one of said lower rod connectors;
said plate lock includes a pair of clamp lock links, a lock bar, compression springs, a pair of tension wires, an actuator, and first and second support blocks;
wherein said first and second support blocks are mounted on said platform; said lock bar is slideably mounted on said first and second support blocks; each of said tension wires is attached to a respective first support block and a respective clamp lock link; said compression springs are disposed on said actuator; and said sliding base plate is fixedly mounted on the lock bar;
said actuator comprises a pair of ribs; wherein said actuator is pivotally attached to said second support block; said actuator pivots into engagement with said first support block when depressed against a force of said compression springs to secure said ring prop in position; and said actuator pivots out of engagement with said first support block when released;

wherein to adjust the ring to a selected height and angular orientation on the platform, the rod locks of the backstay are released allowing each of the telescoping rods to slide freely relative to each other; and the actuator is depressed against a force of the compression springs and into engagement with said first support block; wherein when said actuator is pressed into engagement with said first support block, said ribs press on said respective tension wires which in turn pull and release the clamp lock links from locking engagement with the lock bar, thereby allowing the lock bar to slide freely within the support blocks, and the sliding base plate and the lower end of the yoke are allowed to move horizontally in fore and aft directions on the platform; with the sliding base plate and the yoke free to slide on the platform, the ring is moved into the selected position;

wherein to lock the ring in the selected position, the actuator is released and the compression springs force the actuator out of engagement with the first support block, whereby the ribs are disengaged from the tension wires, the tension wires disengage from the clamp lock links, and the clamp lock links engage with the lock bar to secure the lock bar and the sliding base plate against sliding movement on the platform; the rod locks on the backstay are secured to lock the telescoping rods against relative sliding movement, and the ring is secured in the selected position having the selected height and angular orientation;

said shuttle comprises a housing subassembly, a frame subassembly and a head subassembly;

said frame subassembly comprises a shuttle attachment mechanism that secures the shuttle to the ring;

said housing subassembly includes a shuttle front housing, a shuttle rear housing, a shuttle pivot chassis, and a shuttle handle mounted on said shuttle pivot chassis;

said shuttle attachment mechanism comprising a plurality of rollers, a shuttle frame, precision bearings, and a shuttle latch; wherein said shuttle latch comprising shuttle latch lock linkages;

wherein each of said rollers is supported on said shuttle frame by at least a respective one of said precision bearings; and said plurality of rollers ride along the ring;

wherein said plurality of rollers includes a pinch roller and a pair of tracking rollers;

said shuttle attachment mechanism further comprises a pinch roller assembly and a pair of tracking roller assemblies;

said pinch roller assembly includes a pinch roller frame, pinch roller disengagement linkages, and a pinch roller assembly spring;

wherein said pinch roller is mounted on said pinch roller assembly by at least one precision bearing; said pinch roller assembly spring is mounted between said pinch roller assembly and said shuttle frame; said pinch roller assembly is pivotally mounted on said shuttle frame; and when said shuttle is installed on said ring, said pinch roller is biased against the ring by said pinch roller assembly spring and is releasably engaged with said ring;

each of said tracking roller assemblies includes a respective roller mount, latch bracket, at least one precision bearing, and a shuttle latch lock cam surface; wherein each of said tracking rollers is mounted on said roller mount by said at least one precision bearing; and said tracking roller assemblies are attached to said housing subassembly;

said shuttle latch comprises a fully downward position wherein each of said shuttle latch lock linkages is disengaged from a respective one of said latch lock cam surfaces and said shuttle is released for removal from the ring;

said shuttle latch comprises a fully upright position wherein each of said shuttle latch lock linkages are engaged with a respective one of said latch lock cam surfaces and said shuttle is secured on the ring;

wherein said housing subassembly further and a relationship between the pinch roller frame, the center of rotation of the shuttle pivot chassis, and the attachment location of the pinch roller disengagement linkages to further bias said shuttle into an engagement with said ring;

said frame subassembly further comprises a pair of side main rollers and a front main roller; wherein said front main roller is mounted on said shuttle frame by at least one precision bearing;

each of said side main rollers is mounted on said shuttle frame by at least one respective precision bearing; said side main rollers are disposed in a position offset from said front main roller;

each of said side main rollers includes a respective axle having a first axle portion with a first central axis and a second axle portion with a second central axis; wherein said first central axis is offset from said second central axis;

wherein when said shuttle is installed on the ring said front main roller is adjacent to an outside diameter of said ring, and said two side main rollers are disposed within the troughs on an inside diameter of said ring;

wherein said rotary encoder is mounted on said shuttle pivot chassis within said housing subassembly and communicates with said microprocessor;

said rotary encoder includes an encoder roller, an encoder shaft, an encoder frame, an encoder wheel having magnetic poles, a first Hall effect sensor, a pivot pin, an encoder sensor printed circuit board, a home sensor printed circuit board, a first Hall effect sensor and a compression spring;

wherein said encoder roller is mounted on said encoder shaft which is pivotally mounted within said encoder frame by at least one precision bearing; said encoder frame is pivotally attached via said pivot pin to said shuttle pivot chassis;

wherein said encoder wheel is mounted on an end of said encoder shaft opposite said encoder roller and is in contact with said ring when said shuttle is installed; said encoder sensor printed circuit board is mounted on said encoder frame a distance from said encoder wheel and is in communication with said motherboard assembly and said microprocessor; said first Hall effect sensor is mounted on said encoder sensor printed circuit board and proximate to said encoder wheel;

said compression spring of said rotary encoder biases said encoder frame toward said ring when said shuttle is installed to maintain contact between the encoder roller and the ring during use;

wherein to determine the position of the shuttle as said shuttle moves around said ring, the encoder roller rotates, thereby rotating the encoder shaft and the encoder wheel; rotational movement of said encoder wheel causes the magnetic poles on the encoder wheel to alternate and thereby generate pulses that prompt the first Hall effect sensor to send pulses indicating a fixed distance to the microprocessor; and the microprocessor continuously tracks the position of the shuttle on the ring;

wherein each pulse corresponds to the distance that the shuttle and encoder roller have moved along the ring in relation to a ratio of the encoder wheel's circumference to the encoder roller's circumference;

wherein to calculate the speed of the shuttle as the shuttle moves around the ring, said microprocessor calculates the time between the pulses received from the first Hall effect sensor to determine a rate of rotation of the encoder wheel which indicates the speed of the shuttle moving on the ring;

wherein to determine the direction of movement of the shuttle on said ring, said first Hall effect sensor is arranged in quadrature to send pulse sequences via the encoder sensor printed circuit board to said microprocessor; said microprocessor determines the rotational direction of the encoder roller which indicates the direction of the shuttle's movement on the ring;

said shuttle further comprises a second Hall effect sensor and a recalibration magnet; and wherein said second Hall effect sensor is mounted on said encoder frame and said recalibration magnet is mounted in a fixed location on said ring to recalibrate the microprocessor;

wherein to recalibrate the microprocessor as the shuttle moves around the ring, the second Hall effect sensor is activated when the shuttle passes the recalibration magnet on the ring, the microprocessor is prompted to compare the positions of the recalibration magnet and the microprocessor, and the microprocessor recalibrates to account for any accumulated error in determining the microprocessor's position during use;

wherein said shuttle resistance mechanism applies variable resistance to movement of the shuttle along the ring and is in communication with the microprocessor on the motherboard assembly;

said shuttle resistance mechanism comprises a resistance motor, a resistance roller, a resistance engagement linkage, and a motor support frame;

wherein said resistance motor includes a resistance motor rotor and is mounted on said motor support frame;

said resistance roller includes a resistance engagement linkage; and wherein said resistance roller is attached to said resistance motor rotor, and alternately engages with said ring and disengages from said ring;

wherein as the shuttle moves around the ring, said resistance roller rotates with the resistance motor rotor which creates a resisting force in opposition to the shuttle's motion and produces an electrical current in the resistance motor which is shorted through a field-effect transistor bridge on the motherboard assembly and converted to thermal heat which is dissipated through a heat sink on the motherboard assembly;

wherein said microprocessor sends a pulse width modulated signal to the field-effect transistor bridge to control the amount of generated electrical current that is shunted, thereby varying the resistance imparted to the shuttle traveling on the ring;

said shuttle further comprises a digital display with selector keys and a resistance Hall effect sensor on said display assembly;

wherein said selector keys enable a user to enter resistance parameters into the shuttle, and said digital display exhibits options for modes of operation for the shuttle;

wherein a training routine is selected by a user in which the resistance imparted to the shuttle moving around the ring can be constant or varied through the phases of a user's golf swing;

said resistance engagement linkage comprises a cam plate, an engagement knob, a resistance sensor magnet, a stabilizer block, and a resistance biasing spring;

wherein said resistance engagement linkage is attached to the motor support frame; said motor support frame is pivotally attached to the shuttle pivot chassis in the housing subassembly and extends through the stabilizer block to the cam plate; said cam plate includes a cam path;

wherein the resistance engagement linkage is positioned to ride along the cam path on the cam plate; the cam plate is attached to the engagement knob and rotationally locked thereto; said resistance sensor magnet is disposed on the engagement knob; the resistance biasing spring is disposed between the shuttle pivot chassis and the motor support frame to bias the resistance roller toward the ring;

wherein when the engagement knob is rotated, the resistance sensor magnet passes over the shuttle latch lock linkage signaling to the microprocessor the position of the engagement knob; wherein the engagement knob includes a position for engaging the resistance roller with the ring, and another position for disengaging the resistance roller from the ring;

wherein when the engagement knob is rotated to one position, the cam plate rotates therewith; as the cam plate rotates, the resistance engagement linkage rides along the cam path, and the resistance engagement linkage pushes the motor support frame away from the shuttle pivot chassis thereby engaging the resistance roller with the ring; and when the engagement knob is rotated to an other position, the resistance engagement linkage pulls the motor support frame toward the shuttle pivot chassis, thereby disengaging the resistance roller from the ring;

wherein when the engagement knob is in said one position that corresponds to engagement of the resistance roller with the ring, the resistance biasing spring maintains the contact between the resistance roller and the ring, thereby deterring the resistance engagement linkage from separating away from the cam path on the cam plate; and the force required by the golfer to move the shuttle assembly around the ring is influenced by the inertia of the resistance motor when spinning; and wherein when the engagement knob is moved from said one position to said other position that corresponds with a disengagement of the resistance roller from the ring, the resistance engagement linkage rides back along the cam path and pulls the motor support frame toward the shuttle pivot chassis thereby disengaging the resistance roller from the ring, whereby and the force required to move the shuttle around the ring is thereby lessened;

wherein when the resistance roller is disposed against the ring, and the shuttle is moved to a preselected location on the ring, the microprocessor signals the shuttle resistance mechanism to apply a resistance of the preselected training routine to the shuttle via the resistance roller;

said head subassembly comprises a head front housing, a back top housing, and a back bottom housing which cooperate to simulate a golf club head;

said head subassembly further comprises a club guide frame, a club head pivot clevis, a clevis pivot pin, a pivot stop ring, and a head subassembly wiring harness; wherein said club head pivot clevis is rotationally mounted on said frame subassembly; and said pivot stop ring limits rotational movement of said club head pivot clevis and said head subassembly relative to the frame subassembly;

said club shove mechanism comprises a club shove motor, a shove motor pinion and a shove encoder assembly; wherein said shove motor pinion is driven by said club shove motor; said shove motor pinion engages the threads on said shaft;

wherein said club shove mechanism is activated by a signal from said microprocessor which calculates a magnitude of applied shove based on anthropometric data of the user entered into the shuttle;

when said club shove motor is activated by the signal from said microprocessor said shove motor pinion is rotated and the shaft of the club is moved in an axial direction along a longitudinal axis of the club's shaft; as the shuttle progresses around the ring during a user's backswing, the microprocessor monitors the rotary encoder to determine location of the shuttle in order to activate the club shove motor at predetermined locations; wherein said shove encoder assembly is monitored by said microprocessor to thereby maintain coordination between a distance of the club's axial shove and the shuttle's position on the ring;

wherein said shuttle allows four degrees of freedom for movement of the club on said head subassembly which includes rotation around an X-axis, rotation around a Y-axis, rocking about a Z-axis, and longitudinal movement along the X-axis;

wherein the X-axis is aligned with the longitudinal axis of the shaft of the club supported in the club guide frame; the Y-axis extends perpendicularly to said X-axis and through said frame, housing and head subassemblies; and the Z-axis extends perpendicularly to the X-axis and the Y-axis;

said four degrees of freedom comprise first, second, third and fourth degrees of freedom; wherein the first degree of freedom comprises longitudinal movement of said shaft along the length of said X-axis; the second degree of freedom comprises rotational movement of the shaft about said X-axis; the third degree of freedom comprises rotational movement of the club's shaft about said Y-axis; and the fourth degree of freedom comprises a rocking movement of the shaft about said Z-axis;

wherein movement of the club enabled by the first degree of freedom allows for the distance increasing between the user's hands and the shuttle during the final portion of a backswing to properly position the user's hands relative to the user's torso;

wherein movement of the club enabled by said second degree of freedom allows for a rolling motion of the user's hands throughout the swing;

wherein movement of the club enabled by said third degree of freedom allows a supported club to rotate about the Y-axis which corresponds to the breaking of a user's wrists through the golf swing;

wherein movement of said club head pivot clevis enabled by the fourth degree of freedom allows a supported club to rock about said Z-axis, and thereby allows a user's hands to move outside of a swing plane defined by the angle of the ring during a user's swing;

said club lock mechanism comprises a club lock rack, a club lock servo, a club lock cam, a cam pin, and a club lock frame;

said club lock rack comprises threads thereon;

said club lock frame comprises a slot;

wherein said club lock rack is mounted on the club lock frame, said club lock cam is attached to said cam pin, and said cam pin is moveably mounted in said slot on said club lock frame;

wherein the threads on the club lock rack move into and out of engagement with the threads on the club's shaft;

wherein said club lock mechanism includes a locked configuration and unlocked configuration;

wherein in said locked configuration the threads on the club lock rack engage the threads on the shaft of the club; and axial movement of the club within the head subassembly of the shuttle is deterred, whereby the distance between the shuttle and a user's hands is fixed;

whereby in said unlocked configuration the threads on the club lock rack are disengaged from the threads on the club shaft, and the club is allowed to move within the head assembly of the shuttle;

wherein a signal from said microprocessor that is determined by parameters set by a user at startup activates the club lock mechanism;

wherein when said club lock mechanism is activated, said club lock servo drives the club lock cam which moves the cam pin along the slot; wherein when said cam pin is moved in one direction within the slot, the club lock frame is pivoted within the housings of the head subassembly to thereby move the club lock rack into engagement with the club's shaft and into the locked configuration; conversely, as the cam pin is moved along the slot in an opposite direction, the club lock frame is pivotally mounted on the club guide frame to move the club lock rack out of engagement with the club's shaft and into the unlocked configuration;

said means for determining the handedness of the user comprises an optical beam interrupter and a shove encoder assembly; wherein said optical beam interrupter interacts with said shove encoder assembly; wherein said microprocessor monitors and interprets signals from the optical beam interrupter and said shove encoder assembly as the club is inserted into said head subassembly; said optical beam interrupter is disposed on one end of said cub guide frame; and said shove encoder assembly is mounted proximate said club guide frame; whereby the club can be inserted into said club guide frame from either a right-handed direction or from an opposite left-handed direction;

wherein the order in which the microprocessor receives the signals from said optical beam interrupter and said shove encoder assembly determines the handedness of the user;

wherein when said club is inserted into said head subassembly from left to right said microprocessor receives a signal from the shove encoder assembly firstly and a signal from the optical beam interrupter secondly, then the device is setup for a left handed user; and wherein when said club is inserted into the head subassembly from right to left, the microprocessor receives a signal from the optical beam interrupter firstly and receives a signal from the shove encoder assembly secondly, then the device is directed to set up for a right-handed user.

* * * * *